United States Patent [19]

Rudy

[11] Patent Number: 5,543,194
[45] Date of Patent: * Aug. 6, 1996

[54] PRESSURIZABLE ENVELOPE AND METHOD

[75] Inventor: Marion F. Rudy, Northridge, Calif.

[73] Assignee: Robert C. Bogert, Marina Del Ray, Calif.; a part interest

[*] Notice: The portion of the term of this patent subsequent to Mar. 6, 2007, has been disclaimed.

[21] Appl. No.: 680,248

[22] Filed: Apr. 3, 1991

Related U.S. Application Data

[60] Division of Ser. No. 297,910, Jan. 19, 1989, abandoned, which is a continuation-in-part of Ser. No. 147,131, Feb. 5, 1988, Pat. No. 4,906,502.

[51] Int. Cl.$^6$ .............................. B32B 1/04; A43B 13/20
[52] U.S. Cl. ............................ 428/69; 428/71; 428/76; 428/86; 428/119; 428/120; 428/192; 428/250; 428/253; 428/261; 428/304.4; 428/318.4; 36/29; 36/43; 36/44
[58] Field of Search .................................. 428/71, 69, 76, 428/86, 250, 304.435, 188, 318.4, 36.2, 73, 261, 119, 120; 36/219, 49, 44, 43, 3 B, 3 R, 71, 594, 595, 38, 25 R; 128/383, 253, 68

[56] References Cited

U.S. PATENT DOCUMENTS 4,906,502  3/1990  Rudy .......................................... 428/69

*Primary Examiner*—Ellis P. Robinson
*Assistant Examiner*—Donald J. Loney
*Attorney, Agent, or Firm*—Beehler & Pavitt

[57] ABSTRACT

An internally pressurizable lightweight high tensile strength multi-layered structure with an outer barrier layer envelope of elastomeric semi-permeable material for use as a cushioning device is provided. The barrier layer is bonded, at a multiplicity of sites, to substantially the entire distal surfaces of a double-walled drop-thread linked fabric wherein the filaments are a highly distorted, long chain, axially orientated crystalline molecular structure which has a low gas permeability. The bond between the barrier layer and the facing fabric is substantially increased by the presence of fibrils and texturizing. The drop threads which are likewise texturized, function to maintain the composite structure in either a substantially flat or planar or contoured configuration without weldments within the select load-bearing areas. This product is capable of withstanding substantial internal inflation pressures, under long-term steady state and cyclical compression and flexural fatigue conditions. The product is inflated, pressurized and sealed and maintains the internal inflatant pressure for extended periods of time, generally in excess of the useful life of the overall product, by employing the diffusion pumping phenomenon of self-inflation. The cushioning device can selectively control the rate of diffusion pumping phenomenon by varying the density relationship between the elastomeric semi-permeable material of the envelope and the essentially gas impermeable highly distorted crystalline filament material of the fabric, improving the long term performance and durability and reducing the cost, and eliminating some of the disadvantages of the earlier cushioning products. In a limiting case, it is possible to permanently inflate the device using readily available fluids as nitrogen or air.

49 Claims, 18 Drawing Sheets

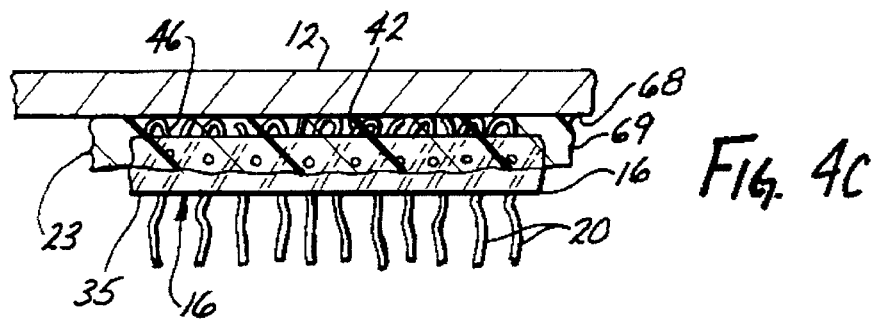
FIG. 4C
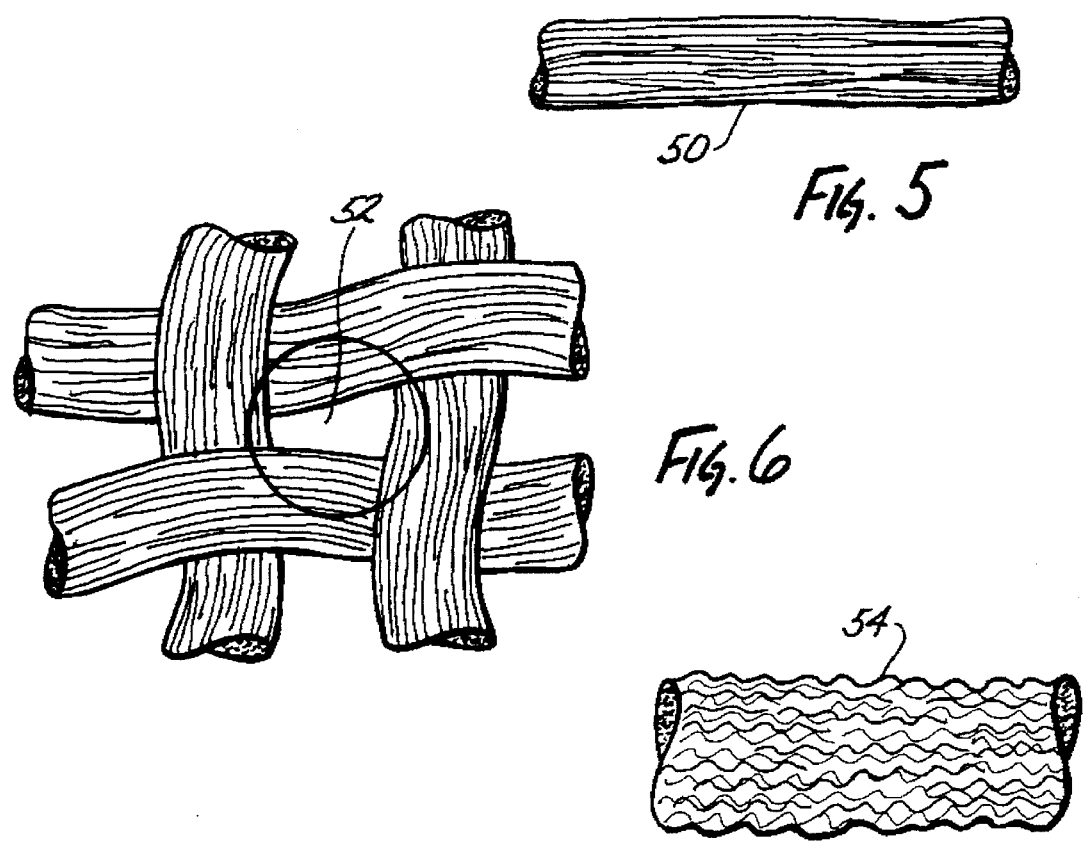
FIG. 5
FIG. 6
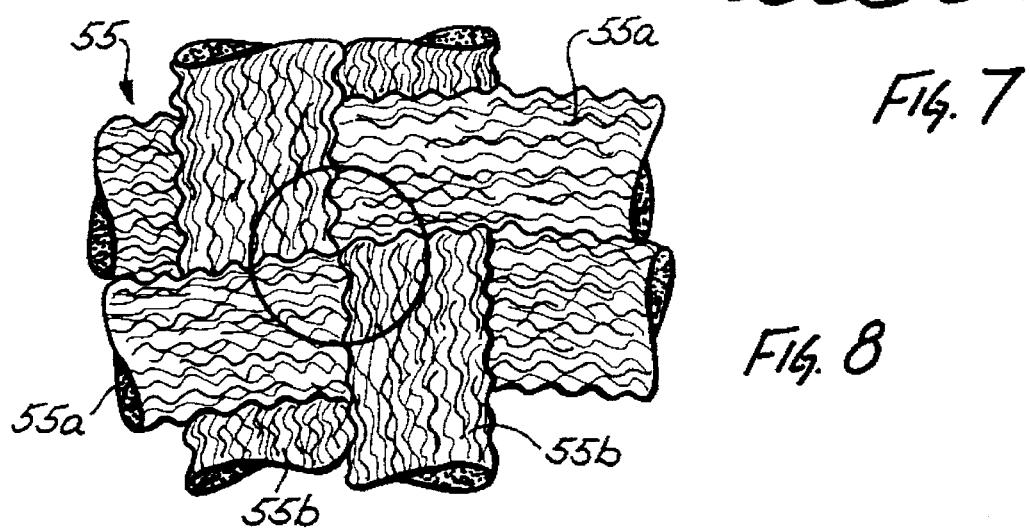
FIG. 7
FIG. 8

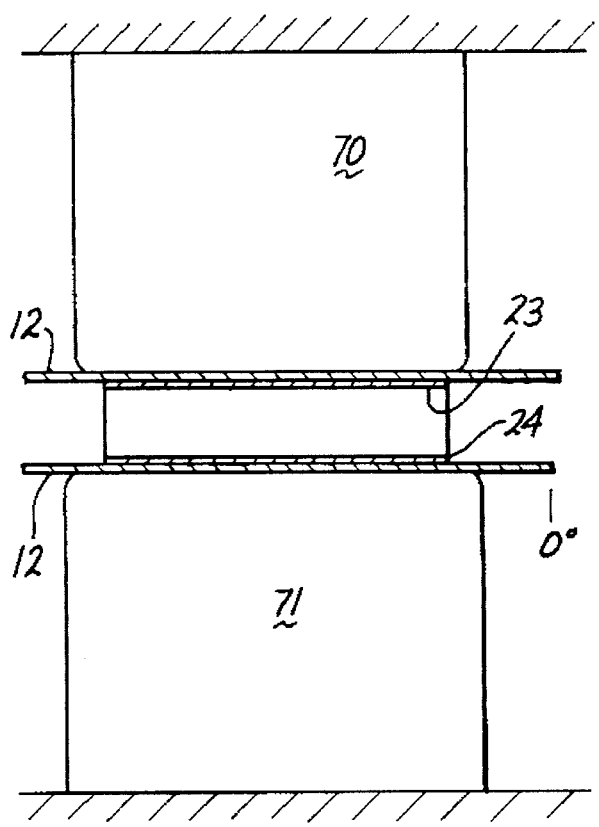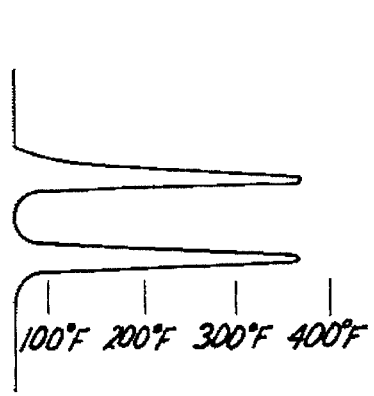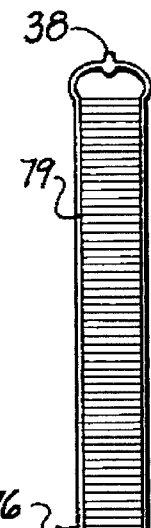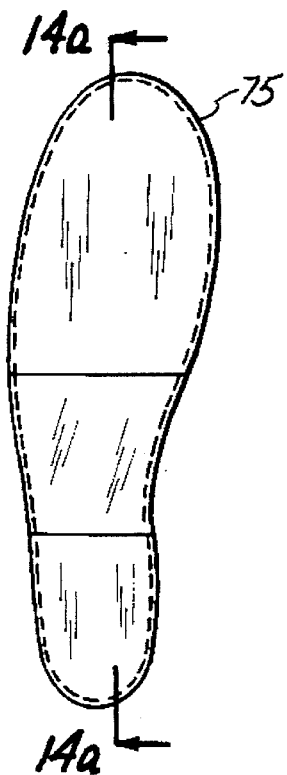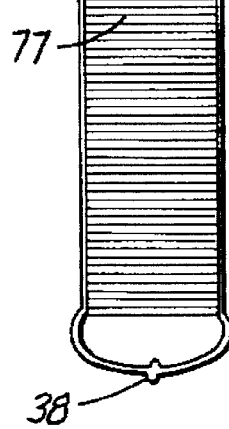

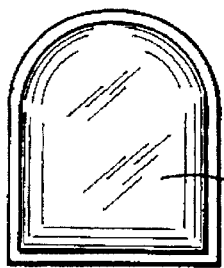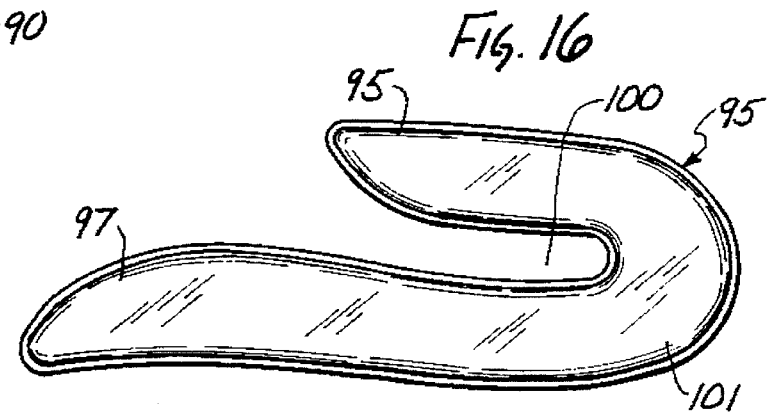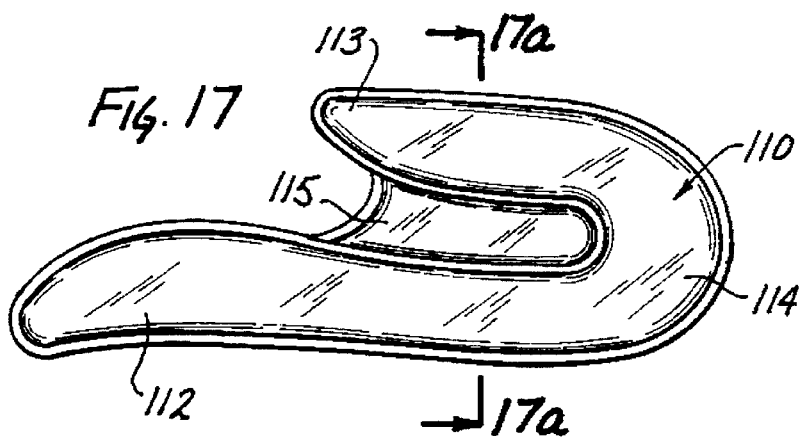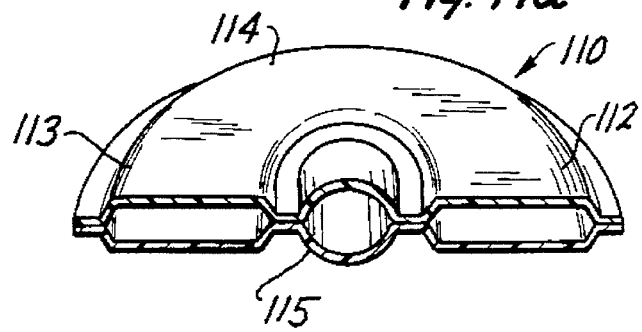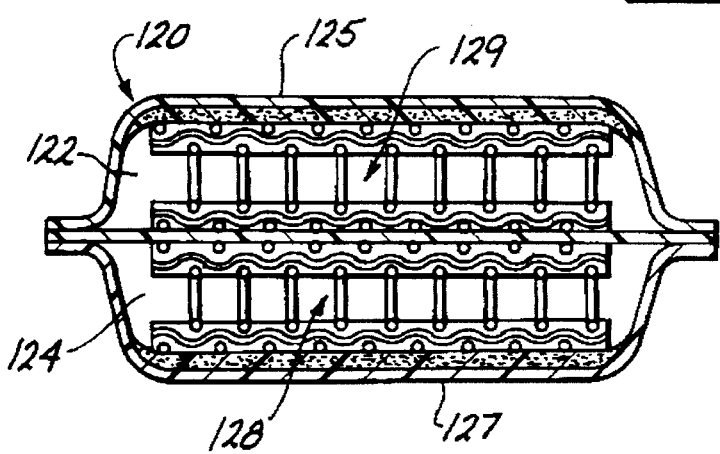

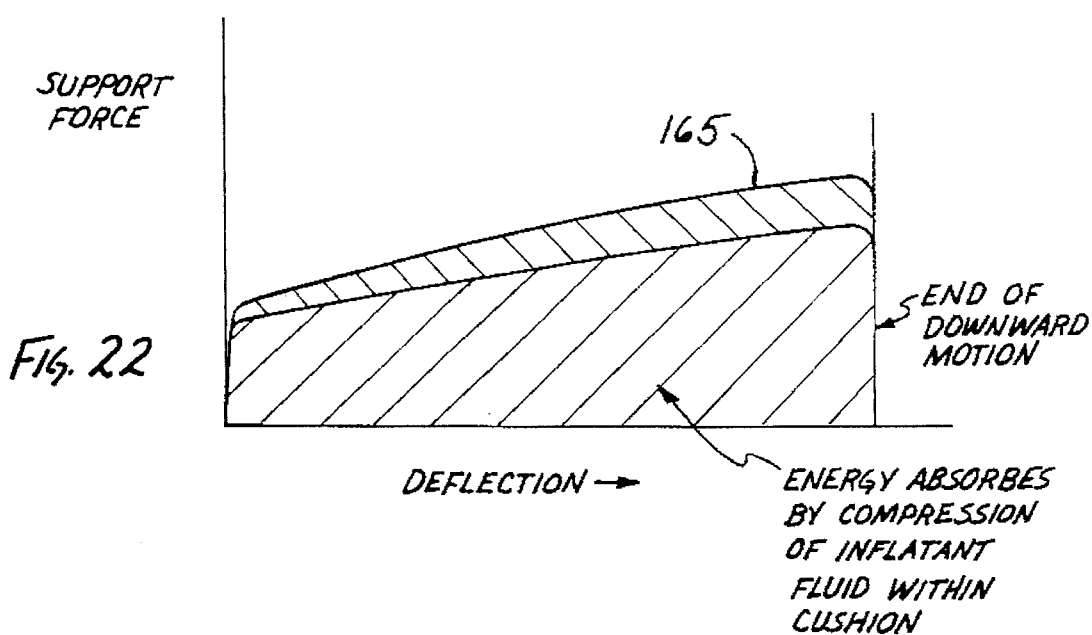
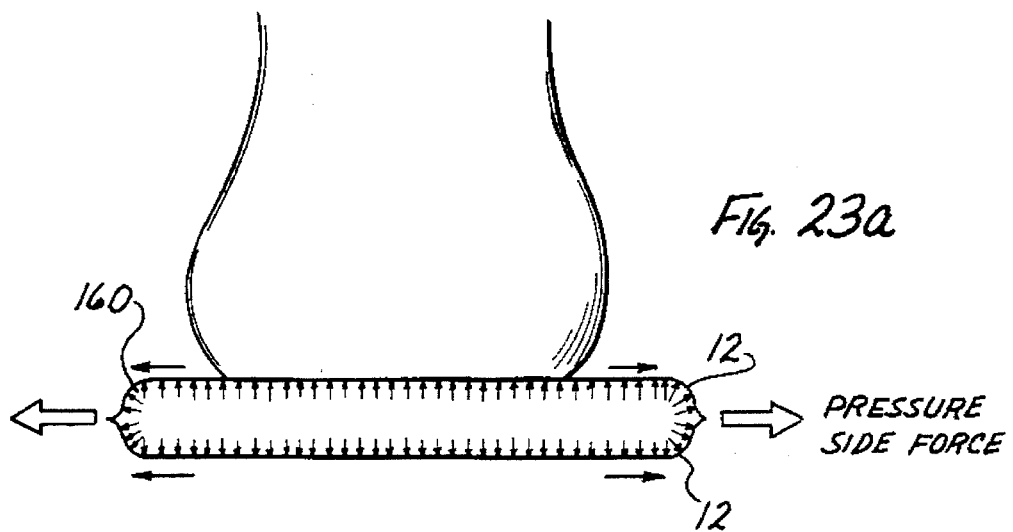
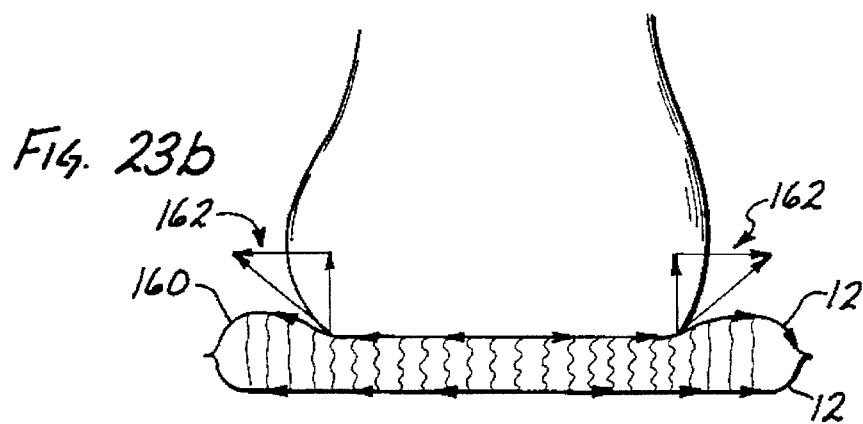

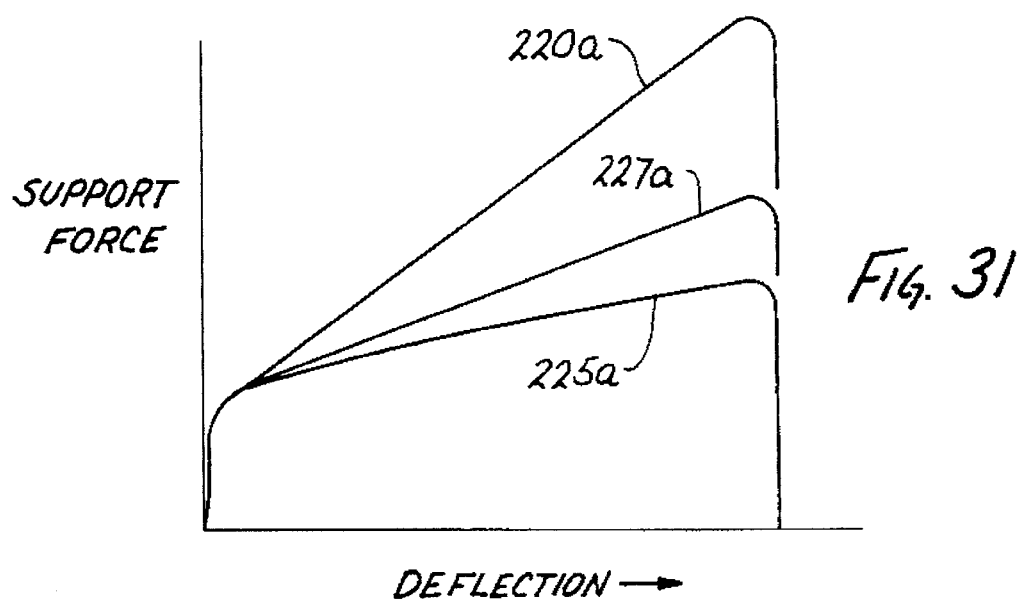
FIG. 31
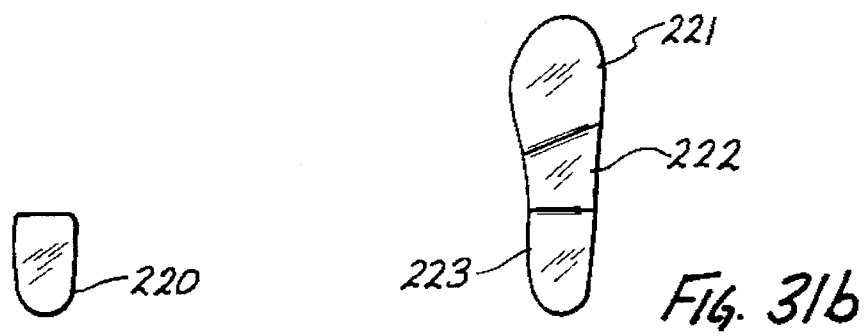
FIG. 31a
FIG. 31b
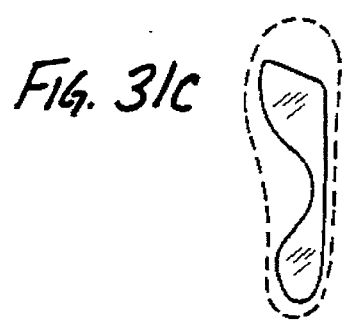
FIG. 31c
FIG. 31d

1

PRESSURIZABLE ENVELOPE AND METHOD

RELATED APPLICATIONS

This application is a divisional of application Ser. No. 07/297,910, filed Jan. 19, 1989 now abandoned, which is a continuation in part of application Ser. No. 07/147,131, filed Feb. 5, 1988 now U.S. Pat. No. 4,906,502. Reference is made to U.S. application Ser. No. 07/298,899, filed of even date herewith and now U.S. Pat. No. 4,936,029, granted on Jun. 6, 1990 and commonly owned herewith.

FIELD OF INVENTION

This invention relates to internally pressurizable multi-layered envelopes, and more particularly, to an improved multi-layered pressurized and gas containing envelope which is particularly adapted for use as a cushioning device such as an insole or other component in footwear.

BACKGROUND OF THE INVENTION

Previously, considerable difficulty had been experienced in providing internally pressurizable multi-layered envelopes wherein the envelope was a flat or uniformly contoured supporting surface, with the capacity of being pressurized to relatively high levels. Previously much of the absorbed, redistributed, and stored impact/shock energy was lost and not returned in a useful form because of the requirement to encapsulate the unit in a viscoelastic foam acting as a moderator to develop the desired smooth or contoured surface.

It was simply not possible to provide a product wherein much (greater than 60%) of the load supporting material of the product was a gas under pressure. With the former product, less than 40% of the energy of impact on the structure was returned in a beneficial, efficient and comfortable manner, the balance of the energy being absorbed and dissipated as heat. The present design is capable of returning, in a useful form, up to 92% of the otherwise wasted energy. In addition, superior cushioning and compliance are also provided, which significantly reduces damaging impact shock loads to the foot and legs to levels under 12 G's.

The new product was developed because difficulty had been experienced with the prior products in producing light weight, long-life, high-pressure inflated structures for use in foot wear and the like which possessed a high degree of resilience and compliance wherein the shock energy absorbed, redistributed and stored at impact is efficiently returned as useful energy in a smooth manner, at a rate equal to or greater than the rate at which the applied load is removed from the devices. Success of this new product depended upon solving several basic problems: 1) separation (delamination) between the tensile element (fabric layer with drop threads) and the gas containing barrier layer, when subjected to high loads with long-term cyclical fatigue conditions, 2) crushing, abrasion, and bending fatigue failure of the drop-threads, 3) hydrolytic degradation failure of the drop threads, 4) fungus, bacteria and hydrolytic stress fracture of the barrier material, 5) unravelling of the tensile-elements immediately adjacent to the cut edges of the cloth, when subject to high loads and bending and flexing, 6) puncture and abrasion failure of the barrier film, 7) leakage of the pressurizing gas at the perimeter seal, caused by fiber filaments extending from the sides of the tensile cloth being trapped in, and bridging the perimeter barrier seal so as to create minute leakage paths through which pressurizing gas could slowly leak out.

In addition to the above problems, one of the more difficult challenges was the provision of a sealed, permanently inflated cushioning device with flat surfaces, as contrasted to tubular or rounded chambers, and which could be made relatively thin so as to achieve 100% air support and cushioning and which possessed sufficient fatigue resistance to withstand millions of compression cycles in use. In the case of consumer items, especially footwear, a useful life of several years is essential. Furthermore this product must maintain the unique and beneficial cushioning properties, without significant degradation throughout its full lifetime. As is apparent, a significant loss or gain of pressure over a period of time is not acceptable, especially in consumer products. It is also desirable to provide an inflated product capable of withstanding relatively high localized loads without bottoming out, such as the loads typically encountered in athletic activities.

For example, in running or other sport events which involve running or jumping, there are substantial localized loads during heel strike or push off. If the cushioning device bottoms out, then the entire purpose of the cushion is compromised. For most conditions encountered, to prevent bottoming out, the inflated product either may be made sufficiently thick or highly pressurized or both. Another desirable approach is to use smaller chambers inflated at lower pressures, and positioned under the load bearing surface so that there is little or no accumulator volume into which the gas may escape. Relatively high pressurization of the prior art inflated devices with rounded tubular chambers produced an uncomfortable feel, unless encapsulated with foam, or used with some other type of surface/contour moderator element.

The load/deflection curve of this tensile product achieves totally new, unique and beneficial cushioning characteristics never before possible with other prior art load cushioning devices.

The load deflection characteristics of my earlier inventions, U.S. Pat. No. 4,183,156, provided a very soft cushioned support under light loads. Then, with progressively heavier loads, the supportive force increased either in a linear or in an exponential manner. This type of load/deflection characteristic is suitable for many applications. However, there are other uses where it is very desirable that the pressurized pneumatic cushioning device initially exhibit a very firm cushion support under light to moderate compression loads, a degree of support greater than the product of the area of the applied load times the internal working pressure. Then, when greater compression loads are applied, the device automatically, at a predetermined load, changes from the firm, board-like cushioning support and exhibits a soft, relatively consistent and gradual increasing level of cushioned support throughout the full, available displacement of the inflated device.

This type of cushioned support embraces substantially different, new novel technology from the prior art. New, novel and highly useful products are now possible that were impossible using the prior art.

Thus, a need exists for an improved essentially permanently pre-pressurized product which has advantages over the prior art inflated products. It is also apparent that there are the practical considerations of being able to manufacture such products relatively inexpensively, at relatively high volume and of a very high quality which assures that the product will be free of leaks and have an acceptable service life even when built as a permanent and integral part of the footwear. It is also an advantage to be able to provide a gas pressurized load bearing cushioning member which may be formed in various shapes, thicknesses, and contours.

BRIEF DESCRIPTION OF THE INVENTION

These and other difficulties of the prior art have been overcome according to the present invention. The present invention provides a gas pressurized and inflated structure which comprises an hermetically sealed outer covering barrier layer which is securely bonded, as will be described, substantially over the entire outer surfaces of a double walled interior fabric structure. The double walled fabric structure comprises first and second outer fabric layers which are normally spaced apart from one another at a predetermined distance. Drop-threads, (or more appropriately drop-yarns) preferably in the form of multi-filament yarns comprised of many individual fibers extend internally between the proximal or facing surfaces of the respective fabric layers. The use of multi-filament drop-yarns is unique to this product. The filaments of the drop yarns form tensile restraining means and are anchored to the respective fabric layers. The restraining means or drop yarns may be arranged nominally perpendicular to the first and second fabric layers, or they may be arranged in a triangular arrangement. It is noted that the yarn comprising the drop threads or restraining means may be separate and distinct from the yarn of the first and second fabric layers, i.e., the yarn used for the first and second fabric layers may be completely different from the yarn of the drop threads or restraining means, depending an the application and the use environment. These restraining means function to maintain the general flat or contoured planar form of the pressurized and inflated structure, and the bonding of the outer covering to the distal sides or exposed outer surfaces of the respective fabric layer prevents the outer covering from peeling away or separating from the distal surfaces and forming an aneurysm. The drop yarns which extend from one fabric layer to the other, function in pure tension as the preferred restraining means and are present in quantities sufficient to hold the structure in the desired planar form without offering substantial resistance to the compression of the two outer layers towards one another. That is, the restraining means have very little compressive strength and very substantial tensile strength and thus do not provide any significant compressive support to externally applied loads and thus exhibit a very considerable fatigue life. It is the pressurized gas component that provides 100% of the cushioned support for the very heavy, life-time cyclic compression loads. The pressurized gas has literally an infinite fatigue life. Thus, by separating the compression, and tension load carrying components of the device in this manner, a very unique and beneficial result is achieved. The resulting product has a fatigue life many times greater than is otherwise possible. The region between the proximal surfaces of the fabric layers is of sufficient openness to allow movement of the pressurizing gas throughout the pressurized chamber.

The hermetically sealed outer barrier layers, which operate to contain the gas, preferably are composed of a composite elastomeric semi-permeable material which is substantially impervious to those gases which are essentially non-polar and that may additionally have very large molecular sizes. The outer barrier layers also can control the rate of inward and outward diffusion of $N_2$ and $O_2$ and other component gases of the ambient air by means of the percentage composition of the crystalline component within the elastomeric component of the barrier layer. Therefore, this outer barrier layer provides a very important secondary function of being slightly permeable to some other gases such as oxygen. With this material, a selective inward diffusion of oxygen occurs from the ambient air which, by means of partial pressures, tends to increase the total pressure within the already pressurized enclosure. This is described in some detail in, for example, Rudy U.S. Pat. No. 4,340,626 patented Jul. 20, 1982; Rudy et al, U.S. Pat. No. 4,183,156 patented Jul. 15, 1980; Rudy et al, U.S. Pat. No. 4,271,606 patented Jun. 9, 1981; and Rudy et al, U.S. Pat. No. 4,219,945 patented Sep. 2, 1980. Attention is respectfully invited to these patents, which are hereby incorporated herein by reference, for a description as to the barrier film, the pressurizing gas and the physical phenomenon which are involved in diffusion pumping and the activated diffusion of gas through the semi-permeable barrier layer.

The structures according to the present invention are particularly unique and suited for use where they are required to absorb and cushion an impact load within a limited space and then return this otherwise wasted energy in a useful manner. This structure has a further advantage because it has a substantially reduced mass as compared to the prior art structures, thus providing pressure constraining walls or elements which have a low hysteresis energy loss when flexed. Gas(s) pressurized to at least 2 psi and preferably more than 15 psi, functions well to provide excellent and comfortable cushioning and then to return the stored energy in a resilient, efficient life-like and beneficial manner. When the structure of the present invention is pressurized to a level in excess of 40 to 50 psi the structure gives back as much as 92% of the energy of an impact.

Therefore, if a weight having the shape, mass, and velocity of a representative human foot at heel-strike, is dropped from approximately two feet height on to a properly designed structure in accordance with the present invention, which is pressurized to a level of approximately 55 psig., the weight will first be well cushioned from the force of impact, such that the G forces on the weight will be in the range of 9 to 12 G's. Then nearly all of the impact energy that is absorbed, redistributed and stored in the device during the downward compression portion of the cycle (i.e., about 92%) will be very efficiently returned to the weight, causing it to rebound to approximately 92% of the original drop height, or 22 inches. The word compliance is used to express the combination of these two factors: i.e., cushioning and resilience. A product simultaneously exhibiting maximum cushioning and maximum useful energy return, or resilience, is considered to have good compliance. Poor compliance would, of course, be the opposite.

The present invention is uniquely suited to footwear and other similar cushioning applications where high style and/ or maximum cushion comfort, support and shock protection are to be achieved in a minimum of thickness and space (.e., low profile). Thicker devices as disclosed in Rudy U. S. Pat. No. 4,183,156, were, in large measure, poorly suited for this type of application. The hills and valleys of the earlier product, coupled with the need for some type of foam encapsulation or moderator device to provide a smooth, comfortable support surface, created a product that was relatively thick and clumsy for this type of application.

The flat or contoured planar load bearing surfaces of the present invention achieves a completely new and unique degree of 100% floating on air cushioned, resilient support, comfort and protection never before possible. This invention eliminates the need for foam encapsulation. However, in certain circumstances it may be desirable to use foam in order to build the unit into a midsole, to absorb moisture and to increase further the service life of the gas pressurized product. The use of foam can also control or eliminate the tendency of the subject cushioning product from buckling, when bent in a sharp radius.

In the present invention the formation of one or more aneurysms constitutes failure. Aneurysms can develop either when there is delamination of the barrier material from the distal or outer surfaces of the double-walled fabric, or by failure of the drop yarns. Such drop yarn failure can be caused by bending fatigue and/or abrasion of the drop yarns, normally referred to as a fibrillation-type failure. See FIG. 30 for an illustration of an electron microscope image of a typical fibrillation failure of drop yarn tensile fibers under the ball of the foot after approximately six months of wear in high performance athletic shoes. As discussed later, the present invention solves these problems for the life of the product.

The use of drop yarns in a double walled structure acting in tension to constrain and shape the barrier surfaces has been proposed previously. An example of the aneurysm which can develop when the drop yarns are of insufficient strength or are deliberately severed, is illustrated for example in Cross, U.S. Pat. No. 3,205,106 patented Sep. 7, 1965. There the product functions completely as a structural device, it does not produce a cushioning function; nor does it solve the problems inherent in a cushioning product such as does the present invention. Cross does not address the problems that must be solved in order to achieve permanent inflation nor does he attempt to use or control diffusion pumping in a useful and unique manner as described in this present invention.

The use of drop yarns and filaments as structural compressional cushioning or stiffening members in double walled structures has been proposed, for example, by Tungseth, U.S. Pat. No. 3,616,126 patented Oct. 26, 1971 and Giese et al, U.S. Pat. No. 4,005,532 patented Feb. 1, 1977. These prior structures are comprised of a single heavy (i.e., large 0.003 to 0.025 inch diameter) plastic monofilament strand woven into a stiff three-dimensional, compression load supportive mat. The Tungseth '126 patent describes a product of this type that relies completely on the buckling characteristics of select diameter plastic monofilaments in the woven structure and which are placed in compression in order to absorb compression shock loads. In Tungseth '126, no pneumatic support is provided at all.

The Giese patent '532 likewise is a stiff compression load supporting mat woven from a 0.010 of an inch diameter plastic monofilament strand in order to form a thermal insulation insert for articles of footwear; wherein it is stated "The separating material" (i.e., plastic monofilaments) "are of such a strength as to prevent deformation of the mesh-like fabrics toward each other when subjected to the weight of the wearer of the shoes." This is identical to Tungseth. The embodiment calls for the mat to be covered with a barrier material and closed to form a hermetically sealed chamber. In one form, air may be left within the chamber to form an insulative dead-air space, while in other forms, the air may be evacuated from the chamber or, replaced with a gas such as $CO_2$ in order to achieve a thermal coefficient of heat transfer that is lower than the ambient air. These structures are very poor shock absorbing devices returning little, if any, of the impact energy to the user and thus wasting and dissipating the energy away as internal frictional heat. Our tests reveal rapid fatigue failure of these large diameter, compression load supporting plastic monofilaments which thus create sharp, protruding plastic splinters that easily puncture the envelope film, resulting in a loss of vacuum or loss of special low thermal conductive gas. The sharp splinters likewise penetrate, irritate and puncture the skin of the foot, resulting in pain, discomfort and possible infection.

Other prior patents include U.S. Pat. No. 4,409,271 issued to Pehr on Oct. 11, 1983 and which relates to a lightweight construction element. The Pehr structure is composed of an untrimmed velvet fabric having a vertical pile between the upper an lower webs. The fabric is rendered impermeable to air by a rubber coating which is vulcanized and the fabric is joined together by a seam. The Pehr product may be filled with a gas, liquid or foam. The Pehr product is not intended to be used as a cushioning or shock absorbing device, as is the case with the present invention.

Similar to Pehr is U.S. Pat. No. 2,743,510 issued to Mauney et al on May 1, 1956. There, however, fabric is used which has not been tensilized so that when exposed to heat and tension, the fabric will stretch.

U.S. Pat. No. 3,205,106 of Sep. 7, 1965 issued to Cross also discloses a structure in which drop cords are present. The drop cords are severed in order to increase stiffness in the product by providing a convex section. This effectively produces an aneurysm, the very situation which the present invention seeks to avoid.

Also of interest, but describing an entirely different product from that here disclosed is U.S. Pat. No. 4,261,776 of Apr. 14, 1981, issued to Lea et al and the patents therein discussed. The Lea et al product is a self-inflating air mattress.

In the present invention the drop yarns consist of many very fine, texturized or bulked separate filaments (not a single monofilament as in the above prior art) each having a high tensile strength and being of a very small cross-section diameter in comparison with the prior art such that they cannot act as Euler column compression members and are completely incapable of supporting any significant compression load by themselves. Should filaments become broken, the resulting product does not create a sharp splinter that could puncture or otherwise damage the barrier envelope. Thus, the load supporting mechanism of the present invention is completely different from the prior art, and with greatly superior high pressure containment, load carrying capability, shock absorption, fatigue life, resiliency, long term permanent inflation and beneficial life-like energy storage and return characteristics that are not even remotely possible with the above stated prior art.

Various gas containing foam materials have previously been sealed in flexible air-tight compartments, see for example, Rosenberg, U.S. Pat. No. 4,590,689 patented May 27, 1986 and Striegel, U.S. Pat. No. 3,914,881 patented Oct. 28, 1975. Foam products of this type pressurized even with supergas (Rudy U.S. Pat. No. 4,183,156) have not been successful because of several problems; (1) the tensile strength of even the best open-cell foam materials is not sufficiently strong and reliable to support the necessary inflation pressures over the life of a product to be used in this manner in footwear; (2) under heavy cyclic compression loads, typical of the foot strike when walking or running, the walls of the individual cells constituting the foam structure abrade and tear as they move against one another and thus rapidly fail, resulting in an aneurysm and/or a subsequent loss of pressure.

It is known that the highest possible quality foam, when used as a cushioning load supportive, compression member (i.e., mid halfsole or insole) in athletic footwear such as running shoes, loses a substantial percent of its original cushioning properties within just a few miles of running, and at about 150 miles approximately 75% of the initial cushioning properties have been lost. The loss of cushioning is the result of internal breakdown of the cell walls of the foam as described above. In this usage, the footwear does not become unusable because of the described breakdown of the foam. The user simply is exposed to reduced cushioning (and poorer foot support) and thus much greater shock forces. However, with a pressurized structure, breakdown of the foam structure results in formation of a protruding aneurysm or bulge under the foot. Even the smallest failure of this type (i.e., diameter) makes the product painful under the foot and therefore unusable.

The relatively high pressures which are required to provide the desired and necessary degree of support and springiness present very substantial problems with the peeling or delamination of the outer barrier film away from the distal or outer surfaces of the double-walled fabric. It is thus important, in accordance with this invention, to provide a strong bond between the outer surface of each of the layers of the fabric and the facing surface of the envelope or barrier layer. In other words, the peel strength or the force needed to delaminate the bonded layers must be very high throughout the life of the product.

It has been found, in accordance with this invention, that if the yarn which is used to form the double-walled fabric and which creates the fiber interface reinforcement of the barrier layer, is in some way bulked, texturized or flannelized or made from at least 20% discontinuous filaments, so that there is a large degree of openness to the yarn and there are numerous loops and/or spirals of small diameter tendrils or other tendrils and projections of filamentary material extending slightly from the distal surfaces of the fabric layers, greatly improved bonding can be achieved. Actually, the tendrils extend from the larger diameter yarns from which the fabric material is formed. The texturizing can be provided for example, by abrading the distal surfaces of the double-walled fabric, by crimping the individual filaments which go to make up the yarn, by using a false twist or air bulk heat-set texturizing step in manufacturing the yarn, and the like. Such a surface or bulk treatment is referred herein as a FIRTEC (Fiber Interface Reinforcement Technology) surface treatment. It is also desirable to use a yarn wherein the filament surfaces are dull or semi-bright, as contrasted to bright. Therefore, in a preferred embodiment, the yarn from which the double-walled fabric is constructed is treated so that in the final product there is a large degree of openness to the yarn, and the distal sides of the respective fabric layers present a great many tiny loops or outwardly projecting. The individual filaments may be continuous in nature in the preferred embodiment so that the loops are anchored at both ends. Crimped filaments when combined into a yarn are also suitable for use according to the present invention. In some cases it may be desirable to have a yarn core of straight fibers surrounded by texturized fibers. Also, fibers, other than fibers of circular cross-section, may be useful to increase the surface area for bonding purposes; such fibers are oval, cruciform, dumbbell or Y-shaped in cross section. It has been found that best results are achieved when the yarn is properly heat set in the texturized/bulked condition.

The presence of a multiplicity of tendrils in the form of loops and the like significantly increases the bond strength beyond that which has heretofore been achieved in the industry to provide exceptionally strong bonding between the barrier envelope material and the facing fabric layer. One of the factors is that the presence of the tendrils significantly increases the surface area of the anchoring components.

Another factor is the essentially uniform and widespread dispersion of fiber inter-face reinforcement anchoring components thus assuring strong bonds over the entire mating surfaces of the fabric and the outer envelope component. Yet another factor is that the openness of the yarn permits a carefully controlled degree of penetration of the coupling material into the facing cloth members.

The cloth or fabric structure which forms the tensile load bearing portion of the inflated product may be constructed according to any known procedures including knitting, weaving, sewing, matting, etc. It is preferred that the drop threads be securely anchored to the fabric layers, for example by a lock stitch, whereby the tensile elements remain in place to prevent ballooning along the edges of the fabric layers. The double needle bar Raschel knit material is particularly satisfactory to use according to the present invention since it provides the lock stitching to the fabric layers. Also material which is woven with a locking stitch is suitable to use. A wide range of products having complex contoured and/or tapered surfaces in many different shapes are possible using high speed computer controlled, gang type sewing techniques where the length and angularity of each drop thread or restraining means may be different from those adjacent restraining means. The drop yarn or tensile elements may extend perpendicularly from the fabric layer or may be at shear force balancing angles. In some instances, where lateral loads are involved, as contrasted to loads perpendicular to the surface of the product, opposing and balancing angular orientation of the tensile yarn has advantages in supporting shear loads which, of course, cannot be supported by the pressurizing gas. It is important that the finished cloth or fabric structure be free of lubricants or processing aids that would be detrimental to achieving a strong bond between the filaments of the fabric and the coupling material.

The yarn from which the drop thread linked double-walled fabrics are constructed must be made of a high tensile strength material which is stable under the intended conditions of both manufacture and usage. A variety of synthetic yarn materials may be used. However, because of the bending and abrasion of the drop threads which occurs when the two outer fabric layers move toward one another when cyclic loads are applied for relatively long periods of time, it is important to use fibers that have good abrasion properties and bending fatigue resistance as discussed later.

In general the filaments utilized in the yarn according to the present invention have a denier per filament of from about 1–20 with a preferred range of from about 2–5. The individual filaments in general exhibit tensile strengths (tenacity) of from 2 10 grams per denier with a preferred range of from approximately 4–6 grams per denier. In general the number of filaments per yarn ranges from about 1–300 with the preferred range being from about 40–200. In general there are from approximately 1–8 yarns per tuft or strand with the preferred range being from about 1–3 yarns per strand. The preferred fabric is knitted with from about 50–1000 strands or tufts per square inch of fabric and preferably from about 400–500 strands per square inch. The bulk density of the fabric is therefore in general in the range of from about 5,000–150,000 fibers per square inch.

It is important that the finished cloth (in addition to the beginning yarn) be given a heat-set treatment so that in the double-walled fabric the drop yarn will tend to stand up so that a given point on one fabric layer will tend to remain axially aligned with the same given point on the opposed fabric layer. This is advantageous in construction. It is preferable during the manufacturing procedure to have the drop yarns standing up so that there is no significant misalignment between the upper and lower surface fabric layers. Texturizing of the drop yarn prevents the individual filaments from acting as Euler column compression members under any circumstance.

The construction of the internally pressurizable multilayer envelop according to the present invention begins with the selection of an appropriate double-walled fabric which incorporates drop threads extending between the proximal surfaces of the respective fabric layers. The distal sides of the respective fabric layers are impregnated with a carefully metered quantity of coupling material. This may be done by starting with large sheets or rolls of fabric material, then applying the coupling material. The properly shaped article can then be cut from these larger sheets or rolls of material that have been pre-treated. This procedure has advantages to be described later.

In general, the coupling material is a product which will, 1) penetrate and bond to the material of the outer fabric layers to a carefully controlled depth, not exceeding the thickness of said surface cloth members, 2) act as a semipermeable elastomeric matrix, penetrating the yarn bundles and tenaciously attaching to and joining together the fibers constituting the outer fabric layer elements, and 3) also forming a strong bond with the semi-permeable elastomeric outer barrier material, or envelope.

The coupling material may be applied using conventional application procedures including, for example, heated platen presses, extrusion procedures, or calendering, spraying and doctor blading.

In general, however, the preferred method application is to provide the coupling material in a sheet form 0.002 to 0.008 inches thick, with 0.004 being the preferred thickness and to melt and press the molten sheet material into the distal sides of the fabric layers. The fabric is moved under an upper and lower heated platen hot press with a sheet of coupling material on top and on the bottom of the fabric and with a sheet of release agent between the coupling material and the heated platens of the press. Such sheets of a suitable release agent (strippers) are used to prevent the sheets of coupling material from sticking to the upper and lower heated platens of the press. The stack of fabric and coupling material sheets are subjected to relatively light pressure in the press between the heated platens (approximately 5-3 psi) for 6-25 seconds in the range of temperature of 340 to 400 degrees F. When thermoplastic polyurethane is used as the coupling material, the temperature has to be high enough to soften and melt the coupling material but not so high as to damage or shrink the fabric. The feed system for this process can be either a batch system (using in-and-out shuttles) or a continuous process using rolls of fabric and rolls of coupling material moved along on an intermittent basis by means of suitable relaxer and indexer conveyor mechanisms. Platen sizes are normally 14 inches×18 inches, 30 inches×30 inches or 36 inches×36 inches, with platens ground flat and parallel within 0.002 of an inch. Temperature uniformity should be plus or minus 5 degrees F. of the set-point. Structural deflection of the press should not exceed 0.002 of an inch to 0.004 of an inch. The cold press used to freeze the hot coupling material operates in the range of 60 to 120 degrees F. The up-and-down motion of the cold press is in the same timed sequence as the hot press. Because some fabrics tend to shrink somewhat when heated during this process, it may be useful to use pre-shrunk fibers when knitting or weaving the cloth. In some cases it is useful to apply longitudinal or lateral tension to the fabric during application of the coupling material. In this way a finished, smooth surface is obtained on both top and bottom surfaces of the fabric.

Accurate temperature, pressure and time control is essential so as to achieve a good grip between the fabric and coupling material while also avoiding driving the coupling material all the way through the fabric which would impair the flexibility of the drop threads or at worst, bond the opposite fabric layers together so the product could not be inflated and pressurized. In the preferred embodiment, the quantity of coupling material available to penetrate the fabric is controlled by controlling the thickness of the sheet of coupling material which is applied to the fabric. Also, the heat is very accurately controlled and regulated so that hot spots do not occur and the depth of penetration does not vary from one area of the fabric to another due to changes in the fluidity of the coupling agent. A superior and preferred procedure presently used follows in detail this coupling material application step.

The outer surfaces of the fabric must have a controlled and uniform degree of closeness or density of weave. The density should be sufficiently uniform such that when the fabric is held up to a light source it must not be possible to detect penetration of discrete light rays. The density should not be too loose in any areas. Also, the density should not be too tight. Such control of density is achieved in several ways: 1) number of yarns per square inch, 2) number of filaments per yarn, 3) amount of the bulking, texturizing or FIRTEC treatment, 4) tension in the Raschel machine during the knitting process, for example. Thus the coupling agent can penetrate both the yarn bundles and the cross section thickness of the surface cloth elements only to a controlled depth and can effectively join together the yarns comprising the outer surfaces of the fabric.

Another factor to control during fabric manufacture is the use of lubricants or processing aids in the manufacture of fibers, yarns and fabric. Such agents can be detrimental to the achievement of a strong bond. Particularly harmful are silicone lubricants and polytetrafluroethylene processing aids. The use of such lubricants should be reduced to a minimum or eliminated completely during manufacture of fibers, yarns and fabrics. If any such agents remain on the surfaces of the fabric, the fabric should be washed (scoured) or properly dry-cleaned prior to application of the coupling agent.

One of the advantages of prefixing the coupling material to the fabric is that it virtually eliminates free and laterally extending fibers when the bonded fabric subassembly is die cut. The absence of such lateral fibers is important in the subsequent sealing operation in which the barrier is joined together in the appropriate areas at the perimeter of the product so as to create an enclosure that can be pressurized with a gas. In effect, the absence of laterally extending fibers prevents leakage paths in the region of the perimeter seal joint or in the portion of the envelop laterally of the edge of the fabric. The presence of small fibers or even one small fiber extending laterally and bridging the perimeter seal forms a potential leak area which is so small that it is extremely difficult to find in the usual quality control inspection. The result is a very slow and virtually undetectable leak which results in loss of pressurization in a period of two to three months.

The coupling material may also be extruded as a semi-molten viscose film and driven into the surface fabric layer(s) using heated, and cooling, rollers on a continuous feed process.

Still another method of applying the coupling material, is to apply by extrusion or spraying a properly formulated-polyol-isocyanate mixture as a viscose partially cured liquid to the surface fabric layer followed by a doctor blade treatment and thus with rollers and release material to drive the coupling material, also referred to as a coupling agent, to the necessary carefully controlled depth. This is not a preferred technique because the residual reactivity of the mixture is likely to react with the tensile yarn so as to weaken and embrittle it. Also the bond strengths with this technique are generally much poorer than can be achieved with the heated platen approach described above.

The coupling material impregnated fabric is next cut into the desired shape, being careful that the cut is free of laterally extending fibers or filaments. The coupling material impregnated fabric is then placed within the semi-permeable elastomeric outer membrane envelope, and the semi-permeable membrane is securely bonded to the distal surface of the coupling material impregnating the upper and lower fabric layers, preferably by radio frequency heating. The temperature of the dies which are used to effect these laminations are preferably adjusted so that melting occurs at the interface between the coupling material and the inner surface of the barrier membranes and not otherwise. The radio frequency power setting, pre-seal, seal, and cooling cycle and die temperatures and die heat sinks are preferably selected so as to minimize the amount of heating to the fabric and the barrier film. At this point the outer membrane perimeter seal is not yet been made.

Another approach that can be used to bond the barrier film to the fabric (impregnated with the coupling material) utilizes a radiant heat source, such as infra-red heaters, and atmospheric pressure to apply the needed bonding pressure. This can be accomplished by sealing the two layers of the barrier film (using a suitable clamping mechanism) around the edges of the fabric, and then drawing a vacuum within the sealed envelope. The pressure of the ambient atmosphere is thus utilized to apply the appropriate laminating/bonding pressure to the external surfaces of the barrier layers as they become molten and flow into the cloth layers.

The part which results from the bonding of the semi-permeable outer membrane to the distal sides of the coupling material impregnated surface fabric members, is uniformly attached by a bond which is enhanced by a multiplicity of tiny connection sites comprising loops or tendrils of the yarn, so that the attachment of the semi-permeable membrane to the fabric is substantially continuous throughout the upper and lower surface fabric members, completely free of yarn fibers or filaments that may bridge (from the inner to the outer surfaces), through the barrier envelope. The outer barrier must also be completely free from pin-holes. The peel strength exhibited by this structure is high; i.e., in excess of 20 pounds per linear inch and generally exceeding the ultimate tensile strength of the tensile yarns when subjected to a typical Instron type tensile test procedure.

The cushioning device is completed into a pressurizable product by welding or otherwise sealing the appropriate portions of the outer membrane envelope material where the material extends beyond the impregnated inner (cloth) member. If the outer membrane material constitutes two sheets of film, then a weld is made adjacent to the entire perimeter of the inner impregnated cloth member. If the barrier envelope is partially pre-formed such as in extrusion, blow molding, vacuum/heat forming, thermal set casting, or vulcanizing, the perimeter seal may have been partially or fully completed during a previous step.

Perimeter sealing may be conveniently accomplished by conventional techniques such as radio frequency welding thermal impulse sealing, cementing, ultrasonic welding, magnetic particle sealing, vulcanizing and the like. It is here that the absence of laterally extending fibers becomes important. If such fibers exist, they tend to be sealed into the perimeter weld during the perimeter sealing operation and form a potential leakage path. If the fiber extends all the way to the outer periphery, it more than likely will leak slowly and undetectably. If it extends only partly, it constitutes a weak area where a leak may take place, especially under relatively heavy and cyclic loads. By applying the coupling material, as described, the subsequent cutting operation is a clean cut which eliminates the possibility of free laterally extending fibers.

Although not presently a preferred method of manufacture, vulcanizable and/or thermal-set elastomers may be used, rather than the thermal plastic urethane elastomers described above, still requiring, however, the same precise degree of control of the depth and quality of penetration of the elastomer into the upper and lower cloth or fabric layers.

As a final step, the chamber, which is now defined between the walls of the double-walled fabric, is pressurized with a suitable gas, preferably a large molecular non-polar gas such as supergas. In a preferred form, the gas is conveniently injected through the use of a needle with the injection port (which may be free of any cloth or fiber material) being sealed after the pressurization is completed. It is also possible to use an inflation/deflation valve. The physical phenomenon which occur with inflation and diffusion are described for example in Rudy U.S. Pat. No. 4,340,626 patented Jul. 20, 1982 and attention is respectfully invited to this patent disclosure.

As mentioned earlier, the present device provides a novel and important means for controlling the rate of diffusion pumping. One objective of such control is to maintain the product at design inflation pressure for longer periods of time than would otherwise be possible. Because in many applications the device is thin, the contained volume of inflatant fluid is small. Therefore, the ratio of surface-to-volume is very high. This can contribute to rapid loss in pressure through diffusion. However, the addition of the crystalline gas barrier elements within the barrier layer serve a very unique and valuable function of metering and controlling the rate of both inward and outward diffusion, particularly as it applies to the $O_2$ and $N_2$ molecules in the ambient air.

There is a further advantage to the incorporation of crystalline gas barrier materials within the elastomeric envelope of the device. Most of the millions of conventional multi-chamber gas pressurized footwear components (U.S. Pat. No. 4,183,156) that have been manufactured in accordance with my earlier patents, and used throughout the world are normally made from ester base polyurethane film, because this formulation has lower gas permeability when inflated with one of the supergases than does the ether-base polyurethane formulation. However, ester-base film in contrast with the ether-base film, has the disadvantage that it is adversely affected by moisture and humidity (hydrolytic instability that can damage physical properties) fungus and bacteria especially at temperatures above 100–110 degrees F. Therefore, such conventional gas pressurized products for footwear are protected by encapsulating them into a foamed midsole, which is costly; and the foam attenuates and detracts from the beneficial resilient properties of pressurized footwear product. On the other hand, the device of the present invention can utilize the desirable characteristics of the more gas permeable ether-base film, and, by imbedding crystalline elements in the outer barrier layers of the structure, control the outward diffusion rates to acceptably low levels while still benefiting from the very slow inward diffusion of the ambient air nitrogen and oxygen molecules which off-set any loss of the supergas so as to achieve a useful life of three or more years. Foam encapsulation is therefore not necessary. Air-cushions performance is greatly improved, and cost and weight minimized.

As a corollary, it is sometimes advantageous to use either thin films or low modulus of elasticity films for the outer barrier layer of the product. This modification will provide a softer, more compliant feel with greater overall flexibility. By controlling or varying the modulus of elasticity, the load deflection characteristics of the final product may be varied. The lower modulus materials provide increased comfort, while the higher modulus materials provide better energy return qualities. The more rapid diffusion rate that may exist when using such materials, can likewise be offset by the addition of the distorted crystalline fibers of the fabric. In some cases softness of feel can also be enhanced using elastic (two-way stretch) fibers as the backing yarns in the outer surfaces of the fabric.

Because the volume of the device cannot grow significantly under pressure (the thickness is constrained and maintained essentially constant by the tension in the pile, or interface, yarns), diffusion pumping of air into the device can readily over-pressurize the product during the initial 2–12 months of inflation. This is a potential problem with the product and of the present invention as applies to the diffusion of $N_2$ into the pressurized device and requires a solution. This potential problem is solved or eliminated in accordance with the present invention by the presence of crystalline gas barrier yarns or particulate elements imbedded within the semi-permeable elastomeric barrier layers of the pressurized enclosure. This technique can limit, reduce and control the inward diffusion of the partial pressure of nitrogen, which is about 12 psi, from the ambient air to nearly zero over a two year period, and greatly reduce and precisely control the inward diffusion of the partial pressure of oxygen from the ambient air.

There are practical limits to the control of diffusion pumping. Even with a very tight weave of the backing yarns in the outer surface of the fabric, some diffusion will occur, and permeability cannot be reduced to zero. However, for the best construction, it is practical to form an effective control for diffusion of most gases of interest, including nitrogen. However, oxygen can diffuse much more rapidly than nitrogen. Using this diffusion control technique, oxygen can diffuse into the enclosure over an extended period of four to twelve months (after inflation and sealing at the factory).

The partial pressure of oxygen within the ambient air atmosphere is about 2 psia (out of a total pressure of 14.7 psia). Thus, reverse diffusion of oxygen into the enclosure can only raise the total pressure within the enclosure by an increment of 2 psi, as a maximum. If desired, this can be offset by initially under-inflating slightly with supergas (or either a mixture of supergas and nitrogen gas or a mixture of supergas and air). However, in some cases such under pressurizing is not necessary; an increment of 2 psi is within the allowable tolerance of inflatant pressure specifications. Furthermore, with age and use, the device does increase slightly in volume. The added partial pressure of $O_2$ is nearly perfect in order to compensate for this small increase in volume of thus provide an unusually uniform inflation pressure throughout the life of the product.

If cost is of major importance, the inflatant gas can be 100% nitrogen; and the same diffusion inwardly of oxygen will occur, assisting in the maintenance of design inflation pressure to offset the slow outward diffusion of nitrogen. A mixture of air and nitrogen can be used in some cases where a large percentage of the cross section of the outer layers of the device contains crystalline material. This can be quite advantageous, as the cost of nitrogen is about $\frac{1}{10}$ that of hexafluoroethane (supergas) and the weight of nitrogen is about $\frac{1}{5}$ that of the supergases.

The pressurized structures according to the present invention enjoy wide utility in all sorts and varieties of footwear including boots, athletic shoes, every day casual and leisure shoes, dress shoes, work shoes, prosthetic shoes/devices, sockliners as well as in other devices including helmets and protective gear (for football, hockey, soccer, baseball, and equestrian endeavors). The invention can also be used for recreational, military, marine, industrial and aerospace applications, including bicycle handle grips, handles for jack hammers, chain saws, hammers, bats, etc. as well as other seat and saddle applications for bicycles, motorcycle and equestrian purposes. Playing surfaces, athletic mats, flooring, work station pads, gloves, life jackets and the like are other markets for the invention. Since supergas is both a superior electrical and thermal insulator, this device is useful where cushioning needs to be combined with electrical and/or thermal insulation. It is further noted that cushioning products made in accordance with this invention and inflated with supergas will have the unique ability to selectively absorb and attenuate potentially damaging high frequency acoustic energy, while simultaneously transmitting low frequency energy waves.

The devices of the present invention are unique at least in that:

(1) Essentially permanent inflation can be achieved by a new and novel technique to selectively control the rate of diffusion pumping emanating from the ambient air.

(2) The use of texturizing, bulking, loops, tendrils and/or single free strands to greatly increases the attachment between the coupling member and the fabric and in turn attachment of the fabric to the associated elastomeric outer envelope material, so as to achieve a bond peel strength several times greater than is possible with other conventional methods.

(3) The two step process for attaching the gas containing envelope to the fabric to achieve the necessary high strength bond by:

(a) Carefully controlled heat, pressure and cooling (freezing) under pressure and timing, applied to the coupling material in order to achieve the essential, precise degree and quality of penetration of said coupling material into the upper and lower facing fabric layers;

(b) Short duration, high power RF lamination of the inner surface of the elastomeric semi-permeable outer envelope material to the outer surface of the fabric material.

(4) The use of special yarns and fibers that have good resistance to abrasion, fibrillation and bending fatigue and of sufficient pile fiber bulk.

(5) The use of a coupling material on the cloth which eliminates laterally extending fibers and thus precludes such fibers from being trapped and sealed in the perimeter seal and thus bridging the perimeter seal and acting as leakage paths for the inflatant gas.

(6) The variety of unique cushioning products which can be made, especially relatively thin and essentially flat or contoured products, of a wide variety of shapes and configurations.

(7) The provision of products that can have controlled surface contours.

(8) The provision of inflated products having a high internal pressure, great durability, longevity, and service life and reliability, and excellent resistance to fatigue failure.

(9) The use of a fabric material comprising filaments made of gas barrier materials securely imbedded within the semi-permeable elastomeric envelope in order to reduce and precisely control the inward diffusion of $O_2$ and $N_2$ from the ambient air, into the relatively thin products which typically have a high surface to volume ratio and thus are much more sensitive to loss of pressure.

(10) Products that achieve the optimum level of cushioning and energy return or resilience (i.e., compliance) within any given package limitation.

(11) Products that are able to selectively attenuate, convert and slow-down potentially damaging high frequency acoustic vibrations while simultaneously transmitting lower frequency acoustic vibrations.

(12) Products that simultaneously cushion and also provide both excellent electrical and thermal insulation, even when surrounded by a high moisture environment.

Other novel features will become apparent from the present detailed disclosure.

Therefore, it is an object of this invention to provide an improved air-cushion type of device which produces superior comfort, more effective cushioning, attenuation of potentially damaging shock loads, and storage and return of energy, in an inflated device which may be relatively thin and which may have essentially flat and parallel or contoured surfaces.

It is a further object of this invention to provide a gas inflated air-cushion type of product of the type described and which will have the needed degree of reliability, durability and service life in application which require superior structural and fatigue resistance properties when exposed to repeated application of severe cyclical loads.

Another object of this invention is selectively to control and slow down the outward flow of inflatant gas so as to maintain uniform internal pressure within a sealed, relatively high surface to volume ratio device at appropriate inflation levels for relatively long periods of time, (i.e., 5 years or longer).

Another object is to slow down and precisely control the reverse (inward) flow of ambient air into the air-cushion during early stages of pressurization (2–12 months), thereby eliminating the tendency of over pressurization of the product which in contrast with my earlier invention, has essentially zero volume growth when pressurized.

A further object of the invention is to permit the use of more readily available, lower weight, less expensive inflatant gases.

A further object is to provide a practical inflated cushioning product which can be pressurized with air or nitrogen, or combination thereof and still have an acceptable service life of at least two years.

Numerous other advantages of the present invention will become apparent from the following description, which should be read with the foregoing, and which, taken together with the accompanying drawings, describes and illustrates preferred embodiments of the various forms of this invention.

BRIEF DESCRIPTION OF THE DRAWINGS

FIG. 4b is a view, partly in section and partly in elevation taken along the line 4b—4b of FIG. 4a;

FIG. 4c is an enlarged exploded diagrammatic view illustrating the bond between the fabric and the coupling agent impregnated envelope in accordance with this invention;

FIG. 5 is a view of a short length of flat, untexturized yarn;

FIG. 6 is a pictorial representation of a portion of fabric knitted or woven from the flat yarn of FIG. 5;

FIG. 7 is a view of a short length of yarn which has been texturized by a false-twist, frictional twist, stuffer-box, edge-crimp, or similar type of texturizing;

FIG. 8 is a pictorial representation of a portion of fabric knitted or woven using texturized yarn as in FIG. 7;

FIG. 13 is a view partly in section and partly in elevation of the composite structure of this invention mounted in a radio frequency sealing press and positioned between the upper and lower set of laminating dies;

FIG. 14 is a plan view and a longitudinal section of full-length inflated element having variable inflated thickness where the thick heel portion is joined to a thinner fore-foot portion by means of a tapered shank portion, in accordance with this invention;

FIG. 14a is a sectional view taken along the line 14a—14a of FIG. 14;

FIG. 15 is a plan view of a heel pad in accordance with the present invention;

FIG. 16 is a plan view of a form of cobra pad cushioned rear foot stabilizer insert in accordance with this invention;

FIG. 17 is a plan view of another form of cobra paid insert in accordance with this invention;

FIG. 17a is a view, partly in section and partly in elevation, taken along the line 17a—17a of FIG. 17;

FIG. 18 is a view, partly in section and partly in elevation, of a multiple layer, multi-chambered product in accordance with this invention;

FIG. 22 is a graph of the force-deflection characteristics of the cushioning element of the present invention showing the portion of the load supported by the drum-head property of the device and portion of load supported by the thermodynamic properties of the pressurized inflatant medium;

FIG. 23a is a schematic cross-section view with vector force diagrams of the cushioning element of the present invention being compressed by a load (as a foot) with the load making initial contact;

FIG. 23b is a schematic cross-section view with vector diagrams of internal pressure forces and forces in the barrier envelope of the cushioning device of this invention, illustrating how the device performs to provide the unique drum-head effect and the unique force-deflection characteristics of this new cushioning element;

FIG. 26a is a plan view of a product in accordance with the present invention having lugs and the like;

FIG. 26b is a sectional view taken along the line 26b—26b of FIG. 26a;

FIG. 29b is a cross-section view of the fiber bundle of FIG. 29a;

FIG. 31 is a graph showing how differences in volume or plan-form can affect the force-deflection, cushioning properties of the inflated device of the present invention, with FIGS. 31a, 31b, 31c and 31d illustrating the geometry represented by the graph;

DETAILED DESCRIPTION OF THE INVENTION

Figure 1:
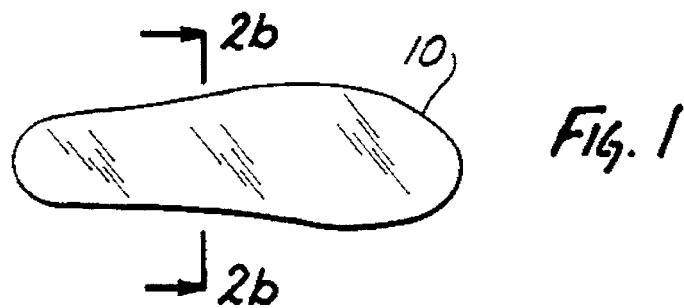
FIG. 1 is a plan view of an insole for articles of footwear according to the present invention.

Referring particularly to the drawings, which show preferred forms of this invention, there is illustrated in FIG. 1, generally at 10, an inflated product according to the present invention which for the purposes of illustration may be an insole. As shown further in FIG. 2, 2a and 2b, insole 10 is composed of a composite structure in which an outer semi-permeable elastomeric barrier layer 12 defines a pressure tight sealed chamber in which a tensile load-bearing structure which comprises a double-walled thread (yarn) linked fabric indicated generally at 14 is positioned. The double-walled thread linked fabric structure 14 is composed of a first fabric layer 16, a second fabric layer 18 and drop threads 20 (pile interlace yarns) which function exclusively as tensile elements in that they are placed in tension when the envelope is pressurized and sealed. The material of the fabric layers may be different from that of the drop threads. Also indicated in these Figures are layers 23 and 24 of a coupling material, as well as the loops and tendrils 29 and 30 extending outwardly from the distal surfaces 32 and 34 respectively.

Figure 2:
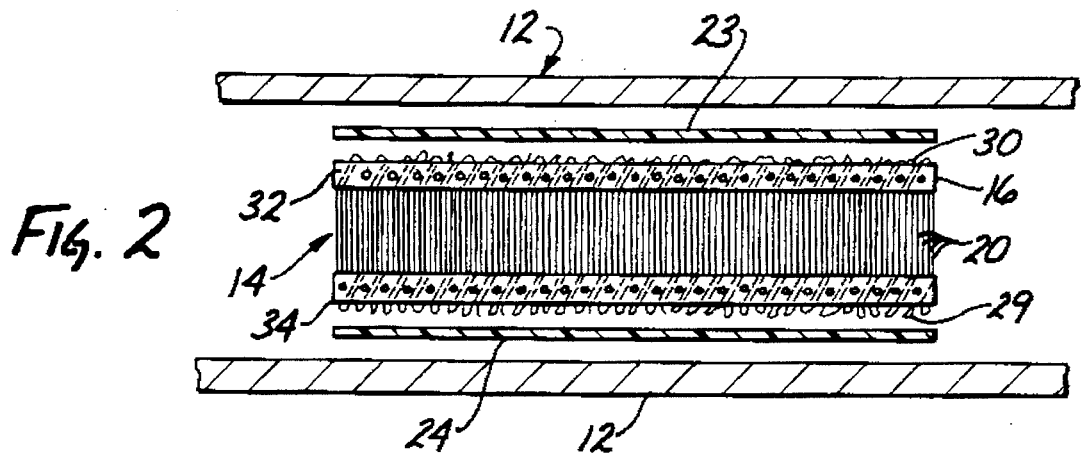
FIG. 2 is an exploded view, partly in section and partly in elevation, of the components of the product of this invention prior to final assembly.
Figure 2A:
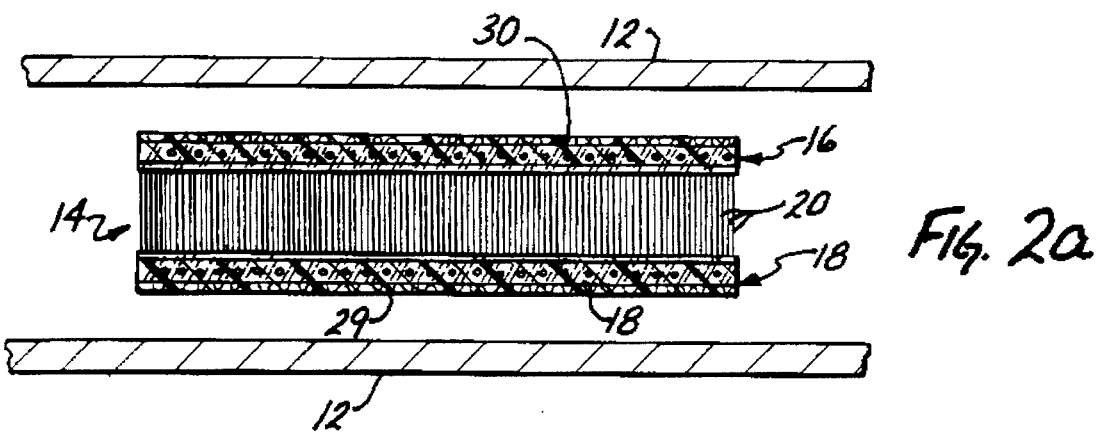
FIG. 2a is a view similar to FIG. 2 showing the structure in a partially assembled configuration with the coupling layer having been impregnated into the outer surfaces of the fabric layers.
Figure 2B:
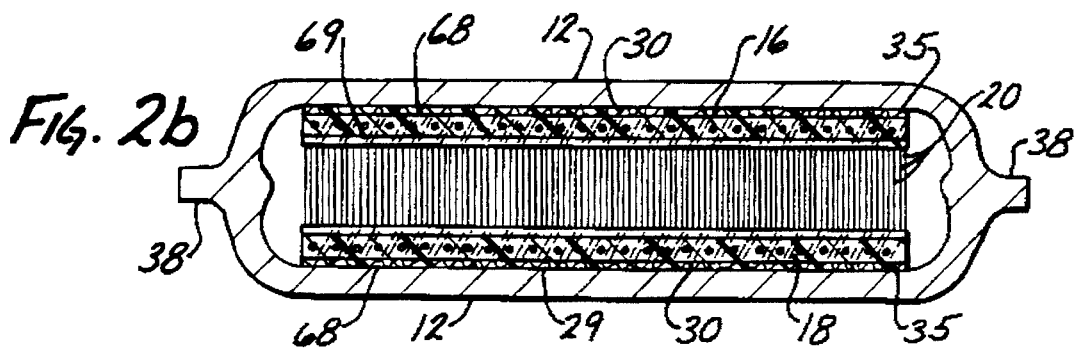
FIG. 2b is similar to FIG. 2 showing the structure in the completely assembled configuration and represents a section taken along the line 2b—2b of FIG. 1.

It is apparent that FIGS. 2, 2a and 2b are progressive views of the general sequence in fabricating the product of this invention. As shown in FIG. 2a and as will be described in detail, the coupling agent 23 and 24 is bonded to the outer exposed surfaces 16 and 18 of the fabric 14. Thereafter, the barrier layer material 12 is assembled and bonded to the coupling material and the underlying fabric 16 and 18 to form an assembled coupling layer 35, the barrier layer being seam welded as indicated at 38 to form an envelope enclosure. Thereafter, the envelope is pressurized with any of the gases or combination of gases described.

The material of the envelope 12 is preferably one of the elastomeric materials noted in the above Rudy patents. Preferred materials are polyurethane materials such as polyester or polyether based polyurethane elastomers, or polyester elastomer, although the invention is not limited to those specific materials. Depending upon the ultimate environment in which the product is used, one of these materials may be preferred over the other. For example, heat, moisture and bacteria tend to create problems over a period of time. If the product is not used in that type of environment, a polyester urethane material operates quite well. If the environment is such that heat, moisture and bacteria are likely problems, the polyether urethane material is preferred. The latter is somewhat more expensive and requires somewhat greater care in the manufacturing process for the final product. With the polyether urethane, the higher diffusion rate with respect to supergas is not a serious factor in the novel products of this invention for reasons to be discussed. It is understood that the outside surface of the envelope may optionally have a relatively thin fabric material bonded thereto.

The fabric material which has been described may be a polyamide, for example the nylon materials noted, or polyester yarns or materials such as that available under the mark DACRON. Polyamide materials tend to have greater tensile strength and greater abrasion and fibrillation resistance than the other materials mentioned, but require more care in production, especially if RF welding techniques are used. In general, the use of high RF energy for a short periods of time, as compared to the other types of heat sealing, is satisfactory. It is of course well know that RF energy is quite accurately controllable.

The peel strength between the facing yarn 16 and 18 and the assembled coupling layer 35 and the semi-permeable elastomeric barrier layers 12 of the envelope must be at least 18 pounds/linear inch. The preferred values are between 25/35 pounds/linear each. Conventional bonding techniques are able to achieve maximum peel strengths of only 8 to 15 pounds/linear inch.

Figure 3A:
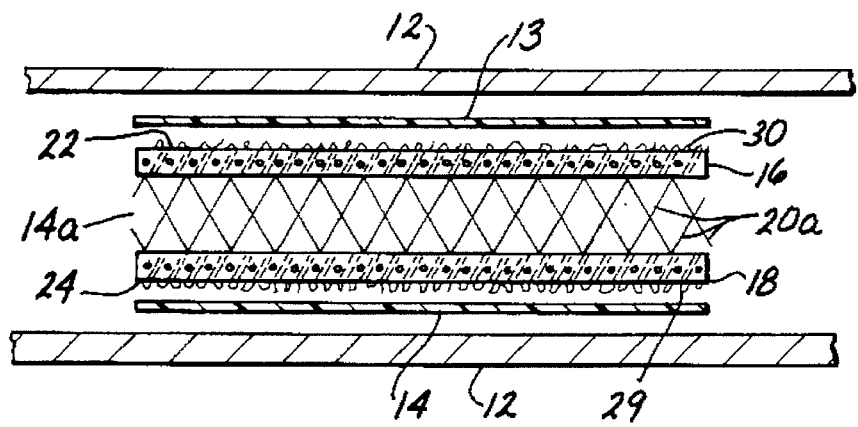
FIGS. 3a, 3b, and 3c are similar to FIGS. 2, 2a and 2b and illustrate the product of the invention wherein the restraining means or drop threads are positioned in a triangular arrangement.
Figure 3B:
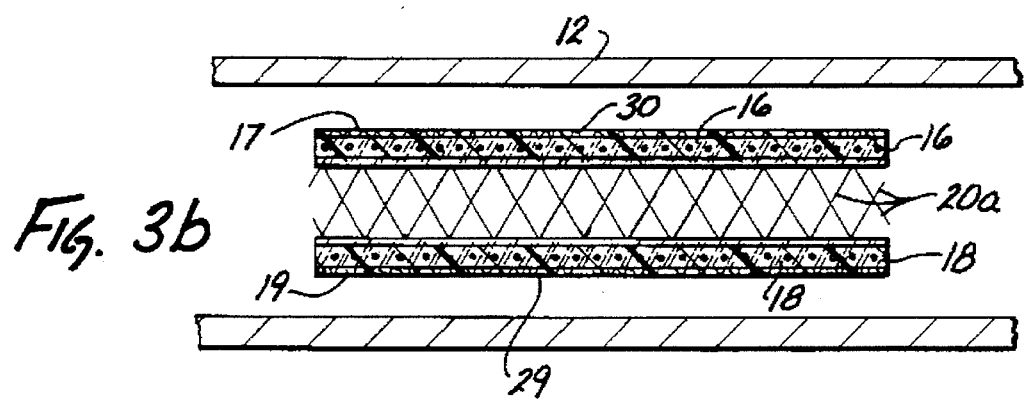
Figure 3C:
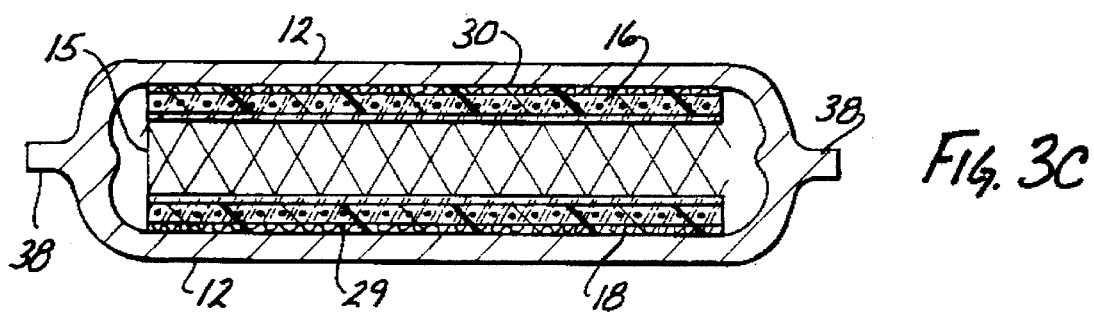

FIGS. 3a, 3b and 3c are similar to FIGS. 2, 2a and 2b, but illustrate a fabric 14a in which the drop threads 20a are angularly oriented. In all other respects, the structures are essentially the same.

One of the important features of the present invention is the provision of a strong bond between the barrier material and the facing fabric material.

Figure 4A:
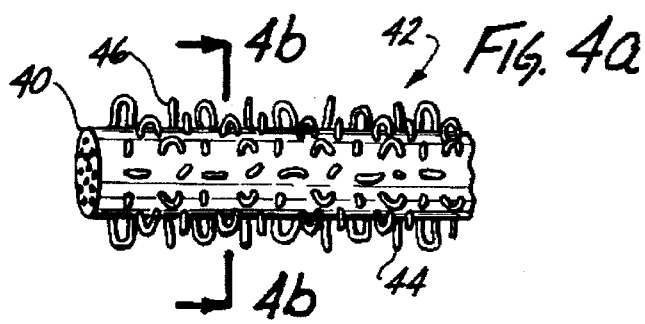
FIG. 4a is an enlarged view of a single fiber diagrammatically illustrating the tendrils and attachment sites.
Figure 4B:
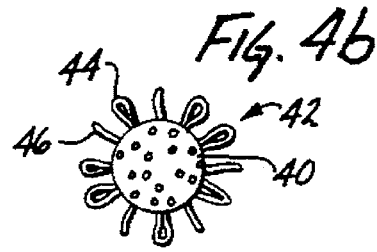

Referring to FIGS. 4a and 4b, which illustrates a fragmentary section, the fabric layers 16 and 18 each includes fibers 40 having the tendrils 42 and 46 extending therefrom. It is preferred that the coupling material and the barrier layers 12 be of the same material to form an optimum bond. The coupling material 23 and 24 only penetrates the fabric layer 16 (and 18) and does not penetrate into the tensile elements 20. Thus, the coupling agent does not invade the region between layers 16 and 18 that is occupied by the tensile elements, thus permitting the tensile elements to function freely and without any restraint. In addition, the elastomeric coupling material 35 securely locks the tensile yarn 20 within the facing layers 16 and 18 so they will not pull loose and unravel adjacent to the cut edges of the fabric when cut to the size and shape of the desired product. This feature is particularly important when the drop tensile yarn 20 is not otherwise locked into the facing cloth layers 16 and 18, for example in a woven three dimensional fabric. However, the preferred method of manufacturing of the three dimensional cloth is double needle bar Raschel knitting.

The texturized and kinked geometry of the individual fibers causes them to act like miniature coil springs. Thus applied loads are more evenly distributed across all of the fibers of the yarn such that the ultimate tensile strength of the yarn is approximately equal to the ultimate tensile strength of the individual fibers times the number of fibers in the yarn; in the non-texturized yarn the ultimate tensile strength is only a small fraction of the ultimate tensile strength of the individual fiber times the number of fibers per yarn. This is because of the "Domino Failure" action of the most highly stressed individual fibers.

Special finishes on the polymer filaments should be used other than a polished finish, (i.e., semi-dull, dull, etc.). This will increase the bond strength and thus peel strength of the semi-permeable elastomer coupling matrix 35. However, this must be used with caution with the pressurized product of this invention, because this process weakens both the tensile strength and abrasion strength of the drop thread tensile fibers 20.

Bonding agents such as Dow Corning Silane Q1-6106 or PAPI 50 can also be used; however tests to date showed less than a 15% improvement in the peel strength when used on non-texturized polyester or nylon 66 cloth.

Filaments having a cross-section other than round (i.e., cruciform, dumbbell, etc.) may also be used to improve bond strength of the coupling layer 35, but may result in lower tensile strength and abrasion resistance if used for the drop tensile yarn, and they tend to be more costly. Flat ribbon type filaments are more effective in controlling the activated diffusion process.

The fiber-interface-reinforcement (facing yarns imbedded into the coupling layer) is essential in order to achieve a bond resistant to fatigue delamination failure. This is achieved by flannelizing, abrading, or texturizing. Various methods of texturizing are available, i.e., false twist, friction twist, stuffer box, edge crimp and air bulk. False twist and heat set air bulk are preferred, with heat set air-bulk the superior of the two as explained later.

The essential characteristic of the outer surfaces of the backing yarns and pile yarns in the facing layers 12 of cloth are as follows: the individual filaments of the texturized and/or flannelized strands of yarn must be kinked or bent, or formed into loops, and/or selectively broken and protruding from the yarn surface. The basic flat yarn is thus expanded in diameter and volume which creates an external surface on both upper and lower facing cloth members wherein spaces that normally exist at the overlapping intersections of the strands of the cloth are filled-in and/or covered over by the loops, strands, or distorted filaments.

Thus it is important to note that appropriate texturizing both the yarn that constitutes the upper and lower facing cloth member and the yarn that constitutes the drop or tensile yarn is essential in being able to achieve the required durability and fatigue strength of the product as explained elsewhere herein. It is likewise important, however, not essential that both the texturized yarn and also the finished three dimensional cloth be properly heat,set.

The surface characteristics as described above are very important. In addition, it is important that the coupling material of the elastomeric coupling layer 35 have a high molecular weight (100,000 to 500,000, ideally 170,000–350,000) and a long-chain molecule. Further, it is essential in the preferred method of applying the polyurethane coupling member into the upper and lower facing fabric, that the heat input be uniform across the entire surface, and that the surface temperatures of the heated platen be carefully controlled within specified limits (350 degrees to 390 degrees F. for polyurethane). Accurate control of the time and heat input assures that the coupling material will have the correct viscosity when either mechanical or atmospheric pressure is applied to drive it into the upper and lower layers 16 and 18 of the fabric. If the viscosity is too high, the material will not penetrate sufficiently into the cross-section depth of the strands of yarns. If the viscosity is correct, the semi-permeable coupling material will move into the upper and lower facing fabric and encompass, surround and adhere to the individual filaments comprising each yarn and simultaneously block and limit the penetration of the coupling material to a depth not to exceed the total thickness of either the upper or lower facing cloth members 16 and 18. It is extremely important that the coupling layer 35 penetration not extend to the inside surfaces of the facing layers of the fabric, such that it would interfere with the free movement of the drop yarn tensile elements 20. This can happen if: 1) the coupling material is not of sufficiently uniform high molecular weight, 2) the temperature of the coupling agent is not at the correct point on the temperature-viscosity curve, and 3) the external surfaces of the fabric are not structured properly as described in the paragraph above, (as well as in the further discussion which now follows in describing the Figures), 4) the time at temperature is incorrect, 5) the applied pressure is incorrect, 6) the composite product is not frozen (cooled) to approximately room temperature before the release paper is removed. This construction of the facing cloth 16 and 18 effectively constitutes a coupling agent penetration-control mechanism. The high molecular weight, long chain molecules of the semi-permeable coupling material drape around the very fine filaments of the texturized and flannelized yarn, the latter forming a filter for controlling and limiting the depth of penetration of the coupling material 35 into the upper and lower facing cloth layers 16 and 18.

At this point in the discussion it is important to discuss further the needed characteristics of the surfaces of the fabric. FIG. 5 illustrates an individual flat yarn 50 (non-texturized) where the individual fibers or filaments are essentially straight and lie together in a relatively compact bundle. There is very little open space between the filaments. The material of the coupling layer 35 cannot penetrate into the cross-section of the yarn, and thus attaches only to the outer surfaces of the yarn bundle. This is not acceptable because (1) the bond is too weak. (2) the open yarn bundle accelerates the process of outward activated diffusion, instead of restricting and controlling it.

FIG. 6 illustrates the additional problem with fabrics having flat yarns. Open spaces 52 exist between the various overlapping yarns of the completed three dimensional fabric which permits the coupling material to flow essentially unobstructed through the facing layers 16 and 18 of the cloth into the pile area of the fabric. The pile (tensile) yarns 20 thus become glued together and the air-cushion will not inflate uniformly to the proper thickness. In extreme situations, the upper and lower facing cloth layers 16 and 18 are cemented together such that no inflation is possible.

FIG. 7 shows a typical individual texturized yarn. Loops, tendrils and filament ends 54 protrude from the surface of the yarn. Individual fibers are kinked or coiled and are not straight. The yarn is fluffed-up or bulked and of larger diameter than a comparable flat yarn. Fibers do not lie together in a compact configuration. There is substantial space and openness between the individual fibers to permit penetration of coupling material into the yarn. The coupling material can easily penetrate the entire cross-section of the yarn, thus locking the individual high-strength fibers together within the elastomeric, semi-permeable matrix (polyurethane) to form an extremely strong composite material. The peel strength between the yarn and the elastomeric matrix is extremely high because of the kinked geometry of the fibers and the full-depth penetration of the elastomer between the fibers.

FIG. 8 diagrammatically illustrates a fabric 55 constructed with a texturized yarn as in FIG. 7. This fabric has no open spaces between the overlapping yarn elements 55a and 55b that would permit excess penetration of the polyurethane coupling material 35 as would be the case in the fabric of FIG. 6 made using a flat yarn. Even with a texturized yarn, it is necessary to follow proper procedures when knitting or weaving the fabric to insure proper (not excessive) tension on the yarn during the knitting or weaving process and to provide uniform density of the fabric surface through all portions of the fabric. In this way, the macro-molecular filter/penetration control technique is preserved and is very effective in achieving the desired precise degree of penetration of the coupling material 35.

Figure 9:
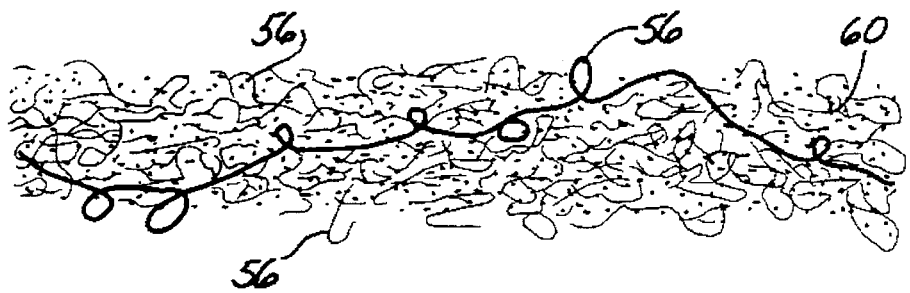
FIG. 9 is an enlarged view of a short length of yarn which has been texturized with a special method, i.e., the air-bulked, heat-set method.

FIG. 9 is a pictorial representation of a single yarn 60 that has been texturized with a very special process. This is an air-bulked yarn. Not only is this yarn bulkier than other texturized yarns, but it is much more permanently heat-set during the texturing process. The heat-setting operation locks in the loops, tendrils and kinks 56 so that even after being stretched out straight under tension and relaxed many times such as during knitting or in the finished product they will return to their texturized state when the tension load is removed. This permanent spring-like property can exist even after several million cycles of tension and relaxation of tension which greatly adds to the bending fatigue resistance and abrasion resistance of the pile (tension) fibers 20. This will be discussed in more detail later. For now, it is sufficient to say that air-bulk heat set texturizing is also a very satisfactory method for assisting in the macro-molecular penetration control of the coupling material 35.

Figure 10:
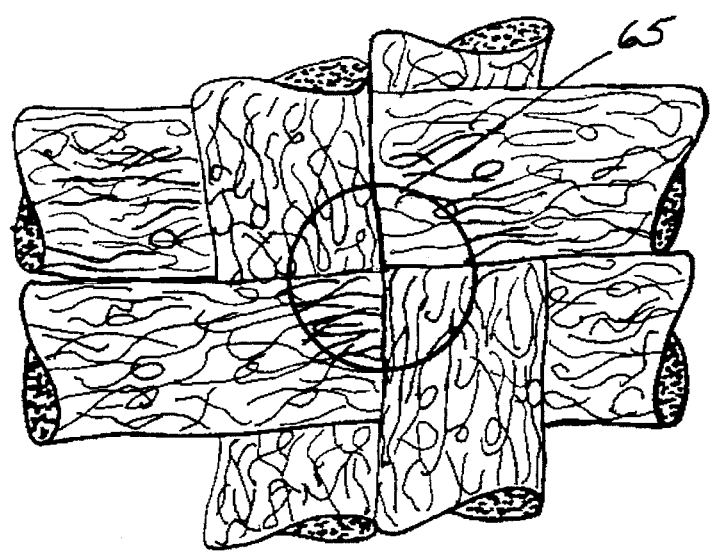
FIG. 10 is a portion of fabric woven or knit using the special texturized yarn of FIG. 9.

FIG. 10 illustrates a fabric 65 which has been constructed using the air-bulked yarn of FIG. 9. The advantages of such a fabric are superior to these of FIG. 8. As is apparent, it is important that the fabric layers be free of any direct unobstructed passages or path ways to the core or center portion of the fabric layers.

Figure 11:
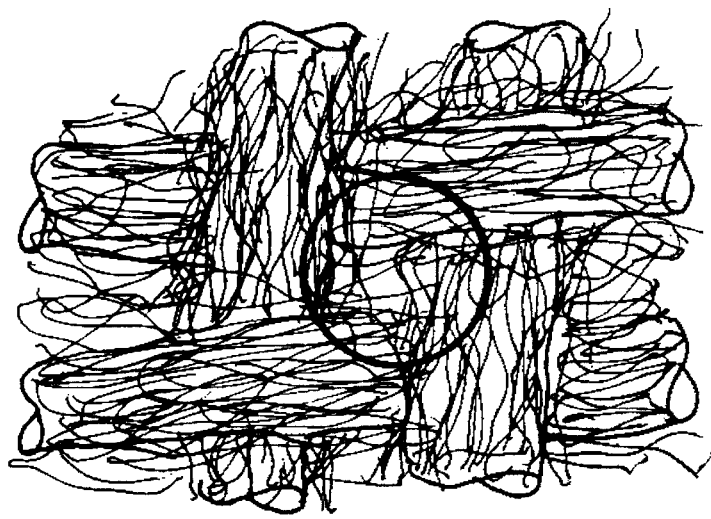
FIG. 11 is a portion of fabric having a flannelized and/or abraded surface.

Other methods of treating the surface of the fabric to add to bond strength can be used, although they are not preferred approaches. These include abrading the surface or flannelizing the surface of the fabric to create loops or tendrils or protruding broken strands. The possible open spaces between the overlapping yarn is thus covered by these tendrils and broken filament loops to achieve at least a partial macro-molecular penetration control of the coupling material, as seen FIG. 11.

Figure 12:
FIG. 12 is a sketch of a short length of yarn which has been spun using a combination of continuous and discontinuous fibers with discontinuous fibers constituting approximately 30% of total fiber content.

Another less preferred approach is to use a discontinuous fiber which has been spun into a yarn containing at least 70% continuous filaments. Thus, the discontinuous fibers or tendrils extend from the yarn surface, and the opposite ends are locked into the yarn/fiber bundle, as illustrated in FIG. 12.

Again referring to FIG. 2, because of structure of filaments and yarns just discussed, as is seen, the distal sides or outer surfaces 32 and 34, respectively, of the fabric layers are populated with a multiplicity of tiny tendrils or loops which form attachment sites or points 29 and 30. These are shown as extending outwardly from the distal surfaces in FIG. 2 for the purpose of illustration, it being understood that they are later bound within the coupling material as shown in FIG. 4c wherein the same reference numerals previously used are again used. These attachment sites are provided by the tendril members which are part of the filaments from which the fabric is constructed.

Referring once more to FIGS. 4a and 4b, the yarn strand 40 includes a plurality of tendrils 42 which extend from the surface portion of the yarn strand. The tendrils may be loops 44 or fragmented fiber strands 46 or both. The procedures for forming such tendrils has already been described. The tendrils function to increase substantially the surface area for attachment, as described. The tendrils extend in various directions, depending upon the procedure used to form them. As shown, there are tendrils at the upper surface of the fiber strand and preferably around the entire surface area of the yarn strand.

In the completed structure indicated for example in FIG. 4c the inner surfaces 68 of the outer semi-permeable barrier layer 12 are rendered molten for the purposes of bonding with the coupling agent 23, for example, which is also rendered molten at the interfacing plane at 69. The application of heat to the envelope during manufacturing is preferably controlled so that molten zone at 35 and the corresponding region of the coupling agent within the respective fabric layers are the only parts of the structure which become molten. This molten layer is very limited in depth, both within the barrier layer and the coupling agent layer (i.e., 0.001 of an inch to 0.002 of an inch deep). However, in this process very strong bonds are obtained.

Radio frequency, dielectric heating (in combination with heat sinks) is particularly useful in selectively focusing heat input and controlling what gets hot and what does not get hot. The set-up which has been very effective in controlling the lamination of the barrier film 12 to the coupling agent at 35 is shown in FIG. 13. The upper and lower laminating dies 70 and 71, which may be configured to match the perimeter of the die-cut fabric, are made of solid brass and are water cooled. These dies are 1 inch to 2 inches in height to focus the zone of maximum RF energy input at the horizontal center plane of the fabric. Because the fabric has low dielectric constant, it does not get hot. On the other hand, the material of the barrier film 12 and the coupling layers 23 and 24 are highly polar and are quickly heated at the interface by RF energy. The cooled laminating dies provide a heat-sink to draw heat away from the outer surface of the barrier film. The result is a sharp focus of heating at the localized interface between the inner surface of the barrier film 12 and the coupling material layers. This area quickly heats up to approximately 350 degrees to 390 degrees F. as is seen in the temperature scale of this FIG. 19. At this temperature, the barrier film and the coupling layer are molecularly locked tenaciously together under the pressure of the laminating dies. This process is best achieved with maximum practical RF energy input of shortest possible time duration.

Upon joining of the envelope layer 12 (FIG. 2b) to the coated fabric material surface, as described, the material of the coupling layer tends to merge or fuse with the envelope material as one cohesive structure in which the fibrils are securely anchored. Since the envelope material is joined to the coupling material and the latter effectively surrounds or covers or encapsulates and penetrates substantially all of both the relatively large yarn and the comparatively small fibers and fibrils, the bond strength is exceptionally high and much higher than could be achieved solely through the use of coupling agents. Significantly, separation as a result of the internal gas pressure does not appear to be at the interface between the two materials, but rather due to fracture or pulling of the fibers and tendrils with respect to the coupling material 35. In other words, the separation above the relatively high peel strengths noted is not delamination of two distinct layers as may be the case of two sheet materials adhesively bonded or laminated together.

The barrier layer 12 is hermetically sealed by means of a weld 38, FIG. 2b, which extends entirely around the periphery of the structure to achieve a pressure tight enclosure. It is preferred that the periphery of the structure at the weld be about one-half the original cross-sectional thickness of the two sheets of barrier material. The weld 38 is normally made as close as possible to the edge of the double-walled fabric 14 without trapping any of that fabric material or strands thereof in the weld itself. Any filaments trapped in the weld will probably cause the device to leak, as will be described in detail. As earlier noted the elimination of fabric or strands in the weld area may be achieved by first applying the coupling material to the fabric material. In certain instances, however, it is desirable to position the weld a given distance from the edge of the cloth, to create a stabilizer and pressure accumulator tube(s) or section. (FIG. 32, 33a–c). If a fabric material is applied to the outer surface of the envelope, the surface other than that which forms the perimeter weld, then none of that portion of the fabric or covering cloth can be positioned in the weld.

If desired, the distal sides of the fabric may be treated with chemical bonding agents such as silanes or silastic materials DOW Q1-6106) to improve adhesion. It has been found, however, that chemical bonding agents are not adequate alone to provide the necessary peel strength.

In a less preferred procedure the distal sides of the fabric 14 are flame treated so as to oxidize the surface and provide a multiplicity of mechanical attachment sites. It has been found, however, that flame treatment may reduce the strength of the fabric beyond a satisfactory level.

Structures according to the present invention having inflated thicknesses in the range of 0.100 of an inch to 0.500 of an inch have been successfully inflated to over 180 psi and have retained those pressures for several months without failure. It is also possible in accordance with this invention to provide products that have variable inflated thicknesses by having a controlled surface contour, i.e., thinner fabric at one portion and thicker at another portion. FIGS. 14 and 14a illustrate and insole 75, for example, wherein the fabric 76, already described, is knitted or woven to have successively thick 77 (heel portion) and thin portions 79 (fore-foot portion) separated by and joined to a tapered ramped section 80. In this form, an inflation/deflation device 81 is also illustrated. The fabric is coated with the coupling material and then die cut with the thick fabric forming the heel portion, the thin fabric the forefoot portion and the tapered section comprising the shank area of the pressurized product.

In general the preferred barrier film material is polyurethane as described in the above identified prior Rudy U.S. Pat. Nos. the other elastomeric barrier films as identified in the previously referred to patents are also applicable. The coupling material is conveniently the same urethane material which is used as the outer barrier layer. The fabric is composed of heat set filaments so that the fabric layers remain in accurate registry with respect to one another during handling and fabrication. Very satisfactory results have been achieved using filament shaving a denier 3, a tensile strength of 3 grams per denier, approximately 40 filaments per yarn and its 1 to 3 yarns per tuft or strand with the fabric being composed of approximately 440 strands or tufts per square inch. When radio frequency heating has been utilized to bond the semi-permeable elastomer layer to the coupling agent coated distal sides of the double-walled fabric it has been found that heating the dies to between approximately 100 and 150 degrees Fahrenheit and utilizing a radio frequency of 27.12 megahertz, achieves the desired bonding without impairing the rest of the structure.

The preferred inflatant gas is supergas, although the invention is not limited thereto. The rate of diffusion of air into the envelope and the reduced rate of diffusion of the supergases out of the envelope are related to the surface area through which diffusion may occur. It is again useful to refer in somewhat more detail to the construction described in FIGS. 2, 2a and 2b, for example. As can be seen, a large percentage of the cross-section of the outer layers of the device is occupied by fibers, comprising the distal surfaces of the fabric, which are imbedded in the elastomeric materials of the coupling substance 35 as well as the elastomeric barrier (pressure enclosing envelope) film 12. The fibers of the fabric are made from highly distorted crystalline gas barrier materials (polyester or nylon, for example). Diffusion rates are very low through such materials. Therefore, the presence of such a large amount of distorted crystalline polymers within the outer composite coupling barrier layers of the product forms an effective control or block to movement, by the activated diffusion process, of gases either in or out of the inflated article. The rate of diffusion, and diffusion pumping, can be controlled by varying the construction or density of the fabric outer surfaces, i.e., the fibers and yarns which make up the backing portion of the fabric. If desired, the construction of the backing surfaces of the fabric can be changed independently of the pile (interlace) portion 20, which extends between and connects the outer surfaces of the fabric. Thus this novel arrangement can retain the desirable and needed properties of the elastomeric materials of the enclosure while at the same time enjoying the benefits of control of diffusion rates, and diffusion pumping, through the selective incorporation of crystalline elements within the coupling layer and elastomeric enclosure. The immediate effect is that in the case of supergas, there is a substantial reduction in what is already a comparatively low rate of diffusion out of the envelope. The practical effect is that the supergas is retained for a much longer period. This is especially important in thin devices in accordance with this invention and which have high surface to volume ratios. For example, the surface area of thin devices in accordance with this invention can have greater than 40 units of surface area for gas diffusion compared to each corresponding unit of contained gas volume. This is approximately 4 times greater than the typical tubular, bulbous air-cushions of the previously identified Rudy patents and thus the problem of maintaining the desired uniform inflation pressure in the product for the stated life expectancy is four times more severe.

The secondary effect is to permit the use of gases other than supergas or a greater amount of the other gases during the initial inflation. For example, it is known that oxygen has a high rate of diffusion through the elastomeric barrier material. Nitrogen gas has a much lower rate of diffusion and the supergases have still a much lower rate of diffusion. Since the fabric operates to reduce the available elastomeric gas passage area for diffusion, the slower diffusing gases may be used as the inflatant, i.e., those gases having a diffusion rate less than oxygen. Because air includes about 78% nitrogen and about 21% oxygen with the balance being other minor gases, air may be used as the inflatant in a properly constructed part, since the diffusion of nitrogen is relatively slow due to reduced surface area for diffusion, and the relatively high rate of diffusion of oxygen represents only 21% (2.5 psia) of the gas component. Thus, by initially inflating at a relatively high pressure with air, the pressure loss over time is relatively small. It is apparent that the use of air or other gases having an effective diffusion rate less than oxygen offers practical advantages. The diffusion barrier properties of the fabric material relate to the material of the fabric being distorted and stressed molecularly as well as being highly crystallographic. In either case the cohesive energy density is such that the fabric material acts as a gas barrier.

When an almost 100% block to diffusion is required, a tightly woven cloth (taffeta has been used successfully) is impregnated with a layer of high temperature melt-point urethane which is laminated to a second layer of lower temperature urethane. This cloth composite is used as the material of the barrier envelope 12 (instead of urethane film). Lamination, using RF energy, successfully bonds the low temperature layer to the coupling agent 48 on distal surfaces of the fabric. In this case, crystalline elements are provided not only by the backing fibers in the surfaces of the core fabric, but also by the crystalline fibers of the taffeta cloth outer barrier layer. In this arrangement, the entire surface of the device, out to and including the perimeter weld, is comprised of this special barrier product, which is selectively permeable to the oxygen gas of the ambient air environment, and which acts as a barrier to the nitrogen gas of the ambient environment.

A good way to visualize some of the above concepts fusing a composite material comprising a combination of both elastomeric and crystalline components is to think of the elastomeric material as the matrix which binds together the crystalline elements. The elastomeric material provides good flexural fatigue resistance and the desired physical properties of modulus of elasticity, elongation, manufacturing processability and heat-sealability. The crystalline components provide the proportional diffusion barrier. In this way, the elastomeric properties of the composite structure exist up to the boundaries between elastomeric and crystalline elements of the structure. Thus, the crystalline materials are protected from damaging fatigue stresses. Heat-sealability is accomplished within the inner elastomeric surface portion of the composite barrier product. A weld bead at the inside perimeter juncture of the barrier product assures that there are no cloth fibers exposed to the internal pressurizing gas so as to create a leaking path.

Another of the advantages of the present invention is the variety of shapes which may be formed. For example, FIG. 15 illustrates a heel ped 90 in which the upper and lower surfaces are planar and essentially in a parallel spaced relation. This heel ped is unlike prior art heel peds due to planar configuration of the surfaces thereof as contrasted to the tubular or bulbous articles of the prior art. Since the heel ped of this invention is relatively thin, it can be highly pressurized and is light weight, it offers significant advantages over the prior heel peds since the heel profile of the footwear can be much thinner permitting use in many types of shoes including men's and women's street or dress shoes. The structure of the heel ped 90 is as already described.

FIG. 16 illustrates an inflated ped 95 in accordance with the present invention and which is sometimes referred to as a cobra pad because of its shape. The interior structure of the device is as already previously described. The unit may include a medial leg 97 and a somewhat shorter lateral leg 99 with an open area 100 between the opposed portions of the legs and forward of the rear section 101. The unit 99 is inserted in footwear such that the medial leg 97 is on the medial side of the foot with the open area 100 generally under the calcaneus. The medial leg is located under the arch of the foot and provides arch support while the rear section 101 is curved, as shown, to fit the general contour of the heel. The top and bottom surfaces are flat and planar and in spaced generally parallel relation. The device tends to stabilize the foot as well as to provide cushioning and arch support.

Referring to FIGS. 17 and 17a, a modified form of inflated stabilizer 110 is illustrated again in the form of a cobra pad with medial and lateral legs 112 and 113, respectively. The internal structure is as already described. The medial and lateral legs are spaced from each other and joined to a rear section which is curved 114 to fit the heel contour. In this form, there is a separate inflated chamber 115 forward of the rear section and between the legs. This inflated section is bulbous in configuration, as seen in FIG. 17a to provide a special cushion element located under the calcaneus. The surface of the bulbous section is above the surface of the adjacent legs. In the form illustrated, a heat seal weld extends all the way around the periphery of the inflated chamber and is a separate chamber from the outer portions of the ped. Thus, the outer portions may be pressurized at one level and the chamber 115 at another level, usually a lower pressure for comfort and cushioning. The center portion may also be connected to the outer portion and thus function as an accumulator to provide different load deflection properties in the air-cushion.

It is understood that the separate chamber 115 may be fabricated with a three dimensional fabric material rather than being merely an inflated bulbous chamber. In this variant, the fabric material may be thicker than the material in the medial and lateral legs for added cushioning and the inflatant pressure may be lower for softness under the calcaneus.

Figure 34A:
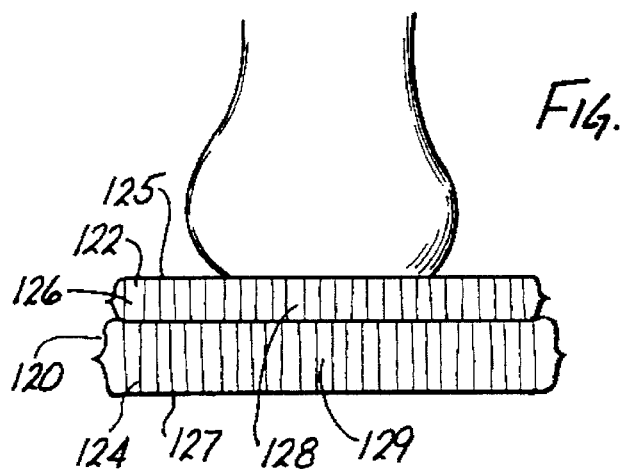
FIGS. 34a and 34b are two cross-section views of a dual pressure, twin chamber cushioning device of the present invention one view showing initial impact of the load and another view showing the differential cushioning characteristic of the cushion partially-compressed.
Figure 34B:
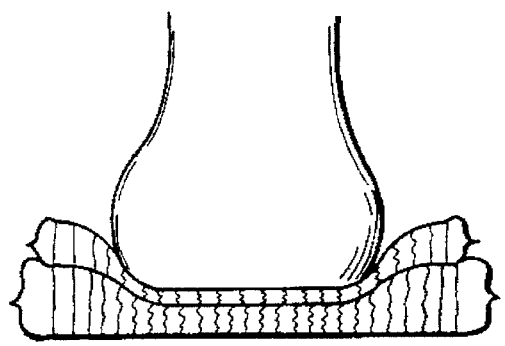

FIGS. 18 and 34a–b illustrate an inflated structure 120 in which there are multiple chambers 122 and 124 formed by three barrier sheets 125, 126, and 127. The barrier sheets are composed of an elastomeric material as already described and a fabric material, 128 and 129, as already described is received between adjacent sheets. This particular form of the invention may be a product in which one chamber is a full length insole and the upper part is in the form of a heel ped or moderator. Further, the upper part may be pressurized to a lower pressure than the lower part in order to provide a relatively soft upper cushion in contact with the bottom of the foot and a more pressurized under section to prevent bottoming out.

In the form of FIG. 18, the upper chamber may be of a smaller surface area than the lower chamber, i.e., the upper part need not be coextensive with the lower part. For some products, it may be desirable to use a heel ped at higher pressure than the lower part since it may be placed in a cavity in the heel while the upper section may function as a full length sock liner. It is apparent, that the present invention offers a wide variety of possible structures and variations thereof.

By way of example, the pressurized article may be used either as a full-length slip-in or partial length sockliner. It may be configured to provide arch support as a slip-in item or built into footwear. It may be installed in footwear during manufacture by placement in a recessed cavity in the midsole or elsewhere in the footwear. It may be fully or partly encapsulated in foam in a midsole or elsewhere in footwear.

Figure 19:
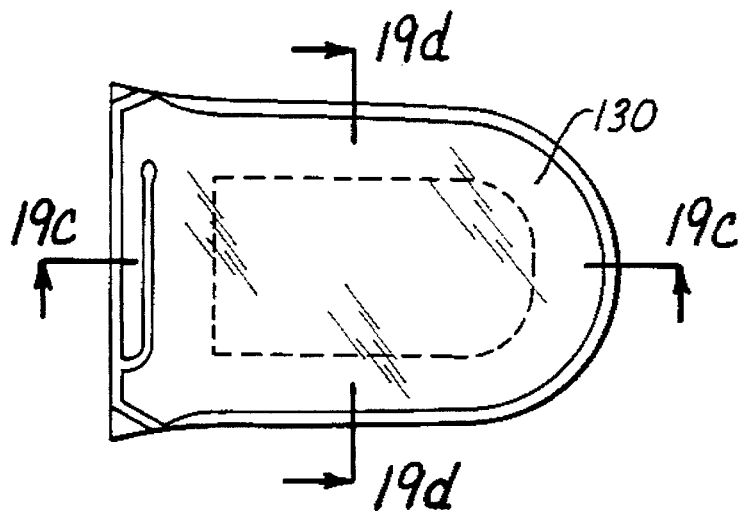
FIGS. 19 is a view of a heel pad where the enclosing envelope is pre-formed by injection molding, blow molding, roto molding and the like and wherein he fabric layer is impregnated with coupling agent and then heat-sealed to the inner surfaces of the pre-formed envelope, in accordance with this invention.
Figure 19B:
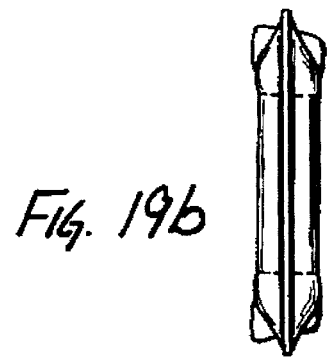
FIG. 19b is a view in perspective as seen from the left of FIG. 19.
Figure 19C:
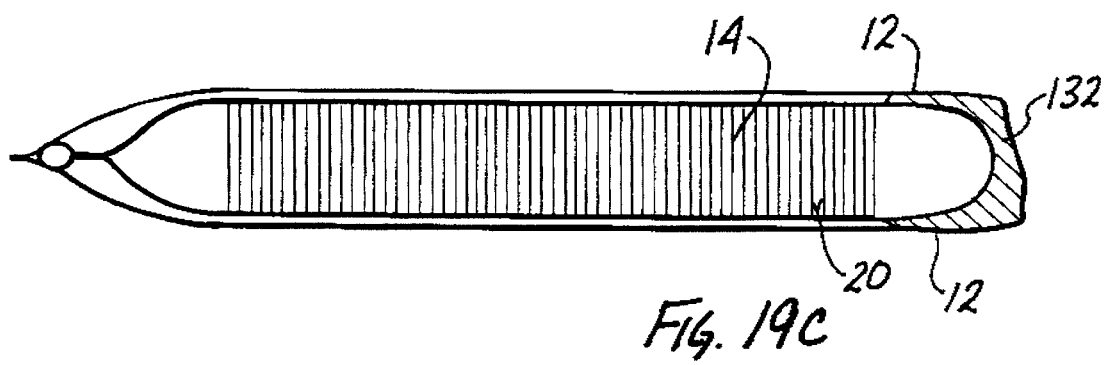
FIG. 19c is a sectional view taken along the line 19c—9c of FIG. 19.
Figure 19D:
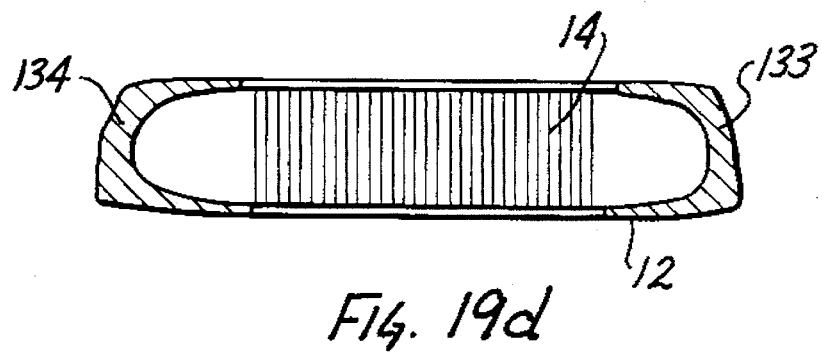
FIG. 19d is a sectional view taken along the line 19d—19d of FIG. 19.
Figure 20:
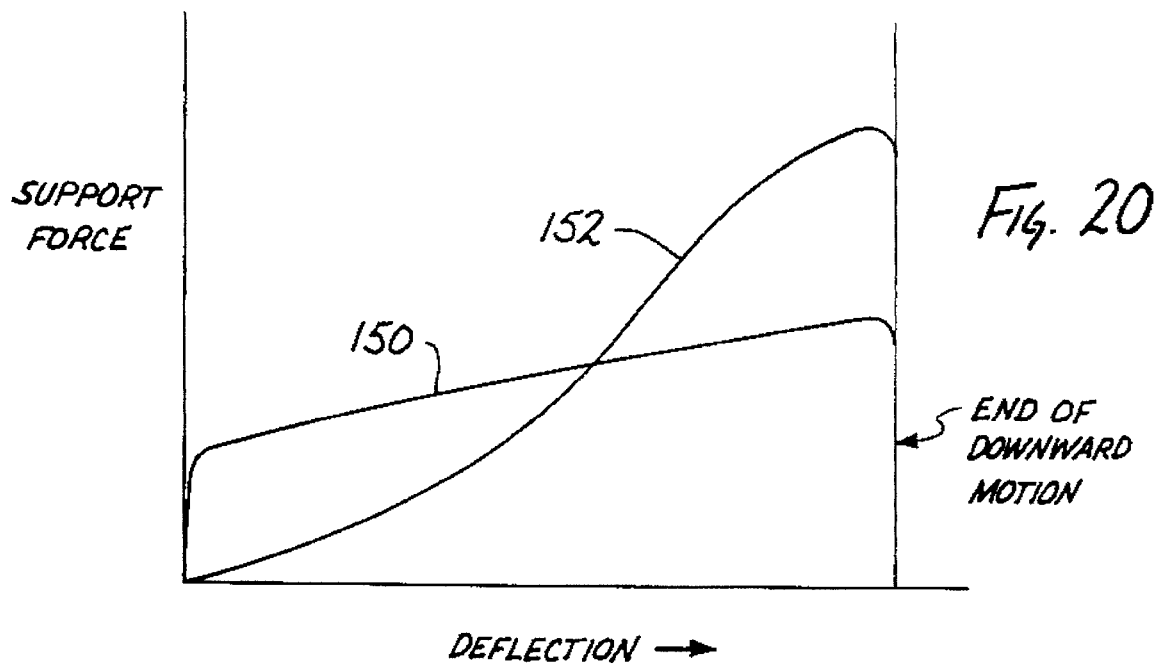
FIG. 20 is a graph comparing the force-deflection characteristics of a standard tubular inflated element of the prior art with the new cushioning device of the present invention inflated to an average pressure level.
Figures 33A, 33B, 33C:
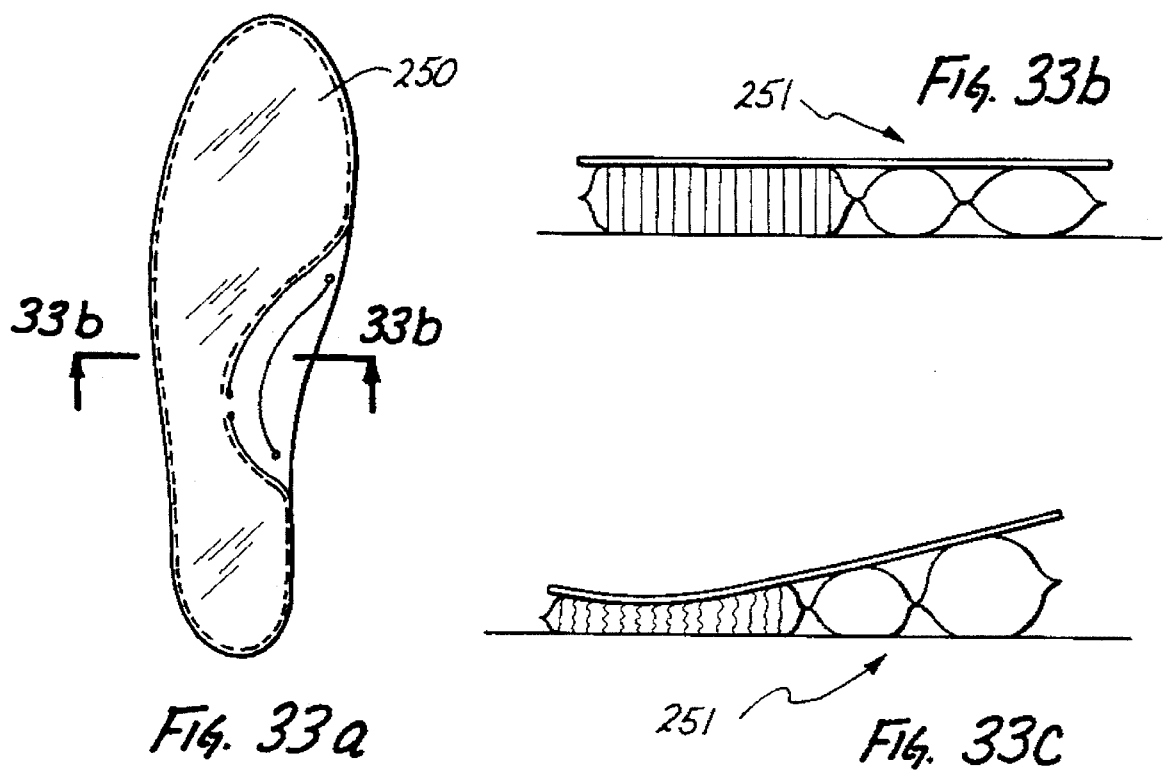
FIG. 33a is a plan view and FIGS. 33b, 33c, and 33d are lateral cross-section views of the device of the present invention having a composite hybrid design with load-proportional, dynamic, automatic longitudinal arch support, and a graph comparing the load-deflection characteristics of the device with and without the arch support accumulator volume.

It is also to be understood that the sheets of the product may have different gas diffusion characteristics. Thus, only one surface layer need be semi-permeable to gas and the other may be impermeable. In effect, all that is required is that there beat least one semi-permeable region in the structure. While it is preferred to have the surfaces of the fabric uniformly bound to the facing surface of the barrier material, there may be a situation in which defined regions of one surface are not bonded or in which no fabric component is present. A typical such structure is illustrated in FIGS. 17 and 17a and FIG. 33a hereof. Further, it is apparent that the envelope may be formed from starting materials other than sheet materials. Other techniques such as blow molding or injection molding may be used to form the envelope, followed by joining the envelope to the fabric components and then pressurizing. FIGS. 19–19d illustrate such an approach. There, the heel ped 130 includes a thicker rear wall section 132 and thicker side walls 133 and 134, as shown. The fabric material 14 is also present. Additional approaches would include vacuum forming, slush casting, roto molding, blow molding, vulcanizing, open pour casting and the like.

At this point in discussion, it is important to emphasize again the unique properties of compliance that the new inflated device provides. As mentioned earlier, an optimum cushioning product should absorb the maximum possible shock input energy, and return the largest possible percentage of that energy; while at the same time attenuating the shock forces to the lowest possible level. Such an optimum cushioning device is defined as having superior compliance.

Figure 21:
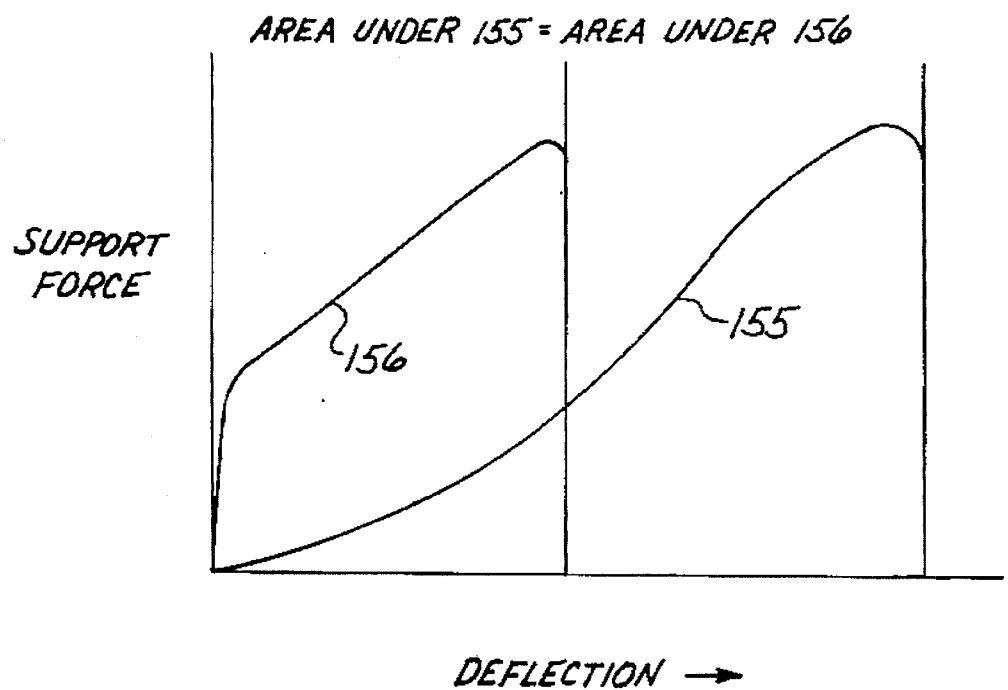
FIG. 21 is a graph comparing the force-deflection characteristics of a standard tubular inflated element of the prior art with the new cushioning device of the present invention inflated to a higher than average pressure.

The manner in which the present product functions to provide good compliance is seen in examination of FIGS. 20, 21, 22, 23, 24. The air cushion of this invention can absorb maximum shock input energy, with maximum-cushioning (good shock attenuation within a maximum allowable deflection) because of the unique shape of the load-deflection curve 150 of FIG. 20. The configuration of this curve 150 approaches a rectangular shape, which is the ideal shape as compared to curve 152 which represents the load-deflection curve for a prior art multiple chamber inflated device. FIG. 21 illustrates the energy absorption of the prior art product as represented by curve 155 as compared to the energy adsorption of a product of the present invention, 156, the latter about ½ the thickness of the prior art product.

FIGS. 22 and 23a and 23b show how this is achieved. The foot is shown initially impacting the air cushion 160 in FIG. 23a. As is seen, the pressure within the device can act over the entire load bearing surface area of the bottom of the foot, instantaneously producing a large supporting force before significant deflection occurs. As the foot sinks farther into the air cushion, as illustrated in FIG. 23b, the upper distal element, which is a composite structure of fabric outer layer imbedded within the polyurethane coupling agent and the barrier film, acts in tension as a drum head and adds a second supporting force by virtue of the vertical components of the tension in the upper distal element, indicated by the vector diagram 162. This additional supporting force is shown in FIG. 22 as the cross-hatched area 165.

Figure 24:
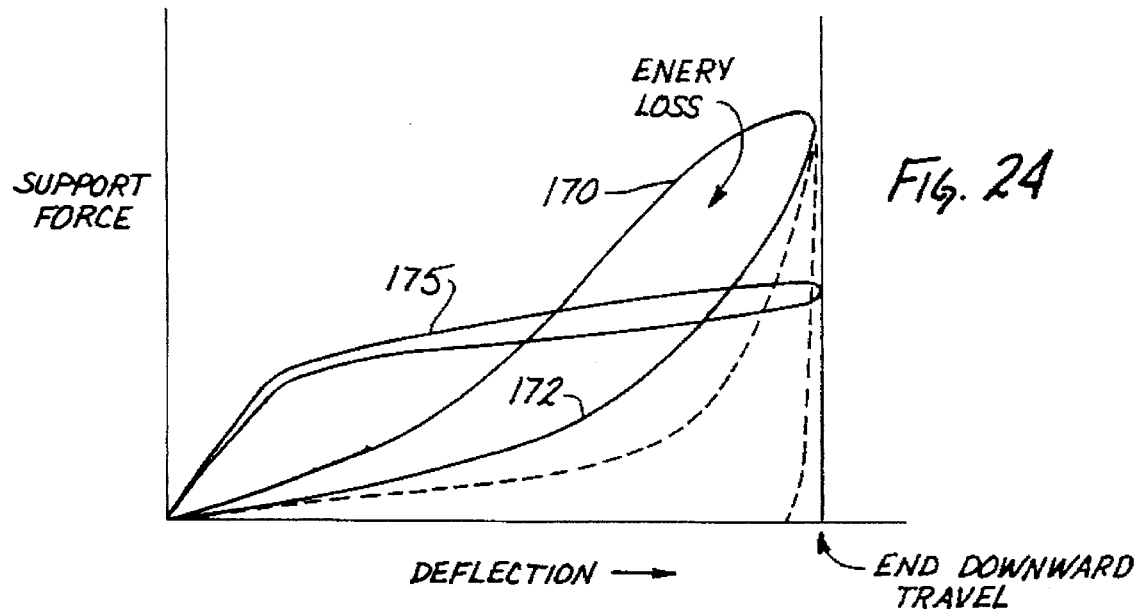
FIG. 24 is a graph comparing the force-deflection and compliance characteristics of a conventional foam encapsulated, tubular cushioned and pressurized sole of the prior art and a non-inflated midsole of foam, sorbathane, or gels, etc., with the force-deflection and compliance properties of the inflated element of this invention inflated to average pressure.

Because of the efficient energy return characteristic of 1) the drum head effect and 2) the very efficient, essentially perfect-gas thermodynamic properties of the inflatant fluid; as well as 3) the fact that cushions of this invention can be built into footwear or other cushioning devices without foam encapsulation (which greatly interferes with the energy-return capabilities) the products of this invention return a large percentage of the cushioned impact energy as compared to foam encapsulated conventional gas pressurized products, foam midsoles, Sorbathane, gels, etc., which waste and dissipate most of the energy, in the form of heat. In FIG. 24, 170 represents the curve for the energy absorbed by a conventional foam encapsulated prior art product, curve 172 represents the energy return (about 40% efficient) for that product; curve 175 represents the energy absorbed by the product of this invention, curve 176 represents the energy return (50% to 90% efficient) for such product; curve 177 is for a foam product (30% efficient), and curve 179 is for Sorbathane and gel type products (2% efficient).

As compared to my conventional tubular prior art pressurized product, it is possible to absorb a given amount of impact energy in much less displacement space using the product of this invention. For example, FIG. 21 shows the product of this invention absorbing the same impact energy in one-half the displacement distance of the conventional pressurized product, still with overall excellent cushioning (i.e., acceptably low-shock loads).

Figure 25:
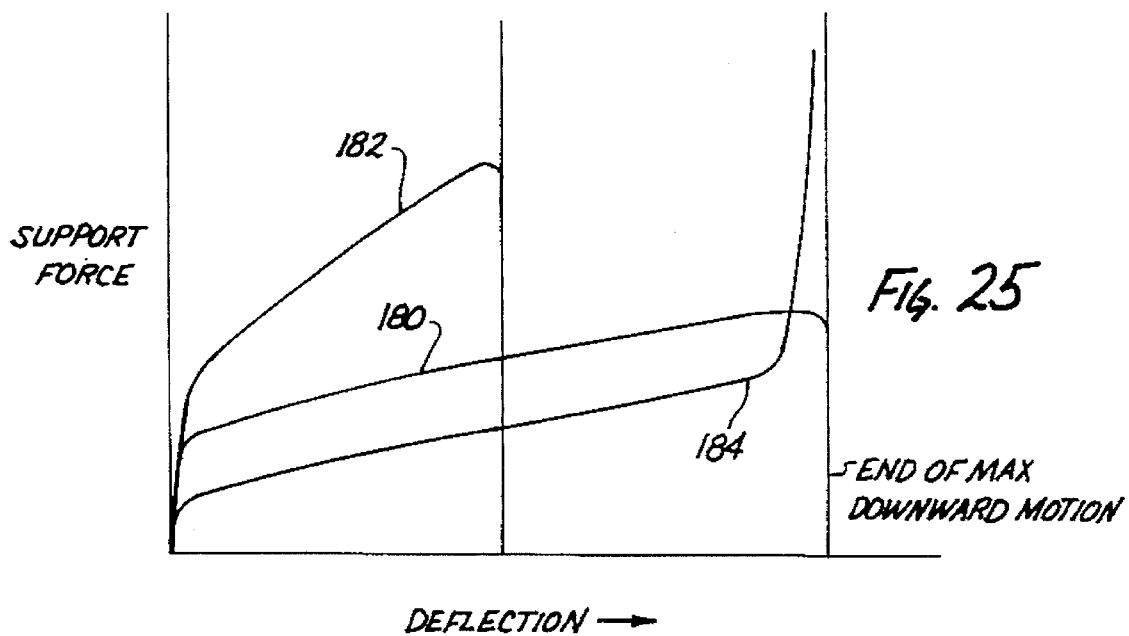
FIG. 25 is a graph showing how differences in inflation pressure levels can affect the force-deflection characteristics of the cushioning device of the present invention.

Inflation pressure is the primary factor (but not the only factor) which can be utilized to alter the shape of the force-deflection properties of the product of this invention. Plots for three different cushions at three different pressures are shown in FIG. 25, i.e., medium pressure curve 180, high pressure curve 182 and low pressure curve 184. As is seen, the high pressure unit can absorb much more energy in a much restricted space (or deflection). Curve 182 of FIG. 25 is identical to curve 156 of FIG. 21. The low-pressure unit has a softer feel, but can bottom-out in some instances.

Figure 26:
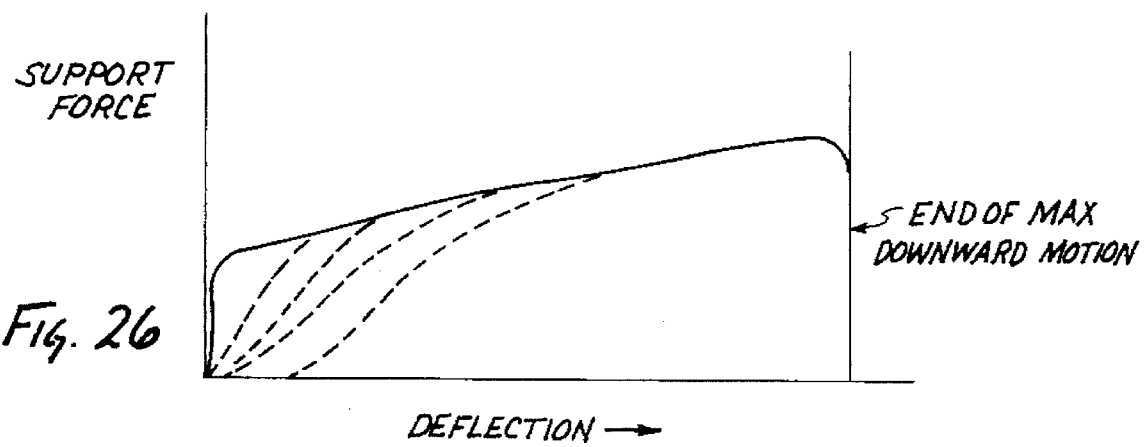
FIG. 26 is a graph showing how different mechanical devices such as lugs, bars, etc. on the inner surface of a moderator pad can affect and customize the force-deflection, spring rate characteristics of the device of the present invention.
Figure 26B:
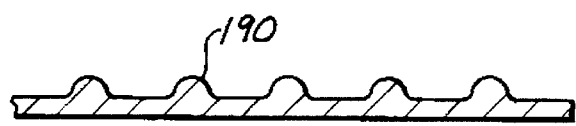

In some cases, the sharp initial rise of the load-deflection curve is objectionable. This occurs in shoes where perceived comfort is of primary importance and impact loading is low, as in street shoes, workmen's duty shoes and also some types of walking shoes. There are various ways to produce an initial softer feel (other than reducing inflation pressure). Some of these are illustrated in FIG. 26 and related FIGS. 26a and 26b. For example, tits, or lugs 190, bars 191 or egg crate pattern 192 on the bottom of the moderator can achieve this effect by altering the load/deflection characteristics of the drum head (see the various dotted portions of the load-deflection curve). The moderator is used with the air cushion of this invention with the studded face in contact with the cushion of opposite the cushion. In addition, the type of yarn, fabric construction, modulus of elasticity of the barrier film, etc., can change the perceived comfort and load/deflection of the device.

It is now valuable to discuss the solution to one of the more troublesome problems encountered during the six-year development program which brought the new air-cushions to the status of a reliable market-ready product.

The problem involves fatigue failure of the tensile filaments (drop-threads) after prolonged exposure to many cycles of bending, flexing, twisting and abrasion. These failures (as well as delamination failures) were encountered during testing of the inflated elements in many hundreds of athletic shoes for many thousands of miles of testing by numerous world class athletes. Although the failure rate was not out-of-line with failure rates of other components of the shoe, for a high pressure inflatable device of this type, the reliability must be greater than for other components because failure results in the overall product becoming essentially useless.

Figure 27A:
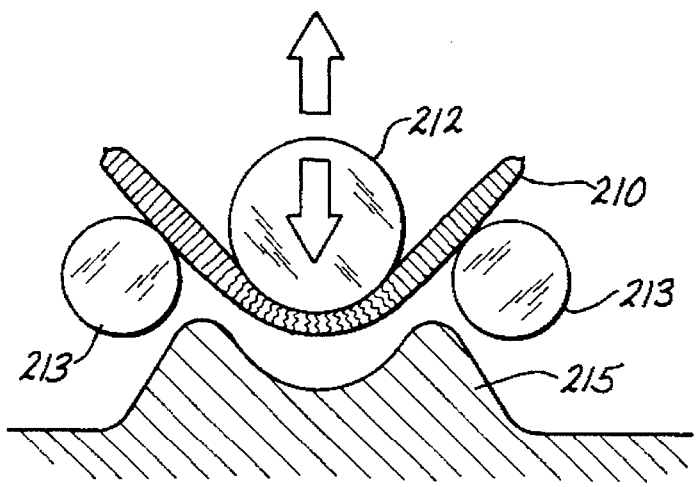
FIG. 27a is a schematic cross-section of the device of this invention mounted in a special Kim flex-test machine to provide accelerated bending fatigue testing of the inflated device, with the schematic showing the inflated element in a partially flexed condition.
Figure 27B:
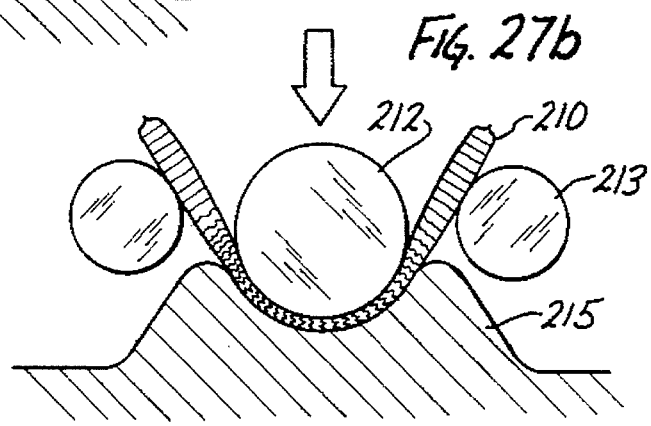
FIG. 27b is a schematic cross-section of the device, same as FIG. 27a, with the inflated element in the fully flexed, bottomed-out condition.

Air-cushions used in athletic shoes are subjected to many different types of loading in addition to that related to simple up-and-down motion. For example, shear forces due to turning and stopping, longitudinal flexing as the foot moves from heel-strike to toe-off rotation movements, lateral flexing and torsional twisting during pronation and supination. Very special testing machines which simulate the in-shoe duty cycle are also used to accelerate the quality control testing of the air-cushions. These machines run at relatively high speed and subject the air-cushion to as many cycles of loading in two days that an athlete would accumulate in two to three years of testing. Furthermore, these tests are much more severe in the type of loading so that two days of testing with what we call the Kim flex tester machines is, in fact, approximately equal to 3,500 miles of marathon running. The typical well made running shoe will not last beyond about 800 to 1,400 miles. Therefore, parts that pass two days of this test will generally out last the footwear by a factor of two or more times. FIGS. 27a and 27b show a typical air-cushion 210 mounted under the movable test head 212 and supported by fixed guides in the form of rollers 213 on each side of the test head of one of these special "Kim" flex-test machines. As is seen, the cushion 210 is exposed to severe up-and-down compression loading as well as bending/flexing as well as some shear action by up and down movement of test head 212 while the rollers remain fixed. Compression is provided by the head 212 forcing the cushion against a contoured cylindrical seat 215, as seen in FIG. 27b. Many of these tests were run to isolate failure modes. The test is able to accurately and quickly duplicate the failure modes experienced in the actual wear tests.

The exclusive purpose and function of the drop-thread yarns is to act as tensile members to contain the pressurizing medium and maintain the desired geometrical configuration and structural integrity of the device. Therefore, the subject failure problem was somewhat unexpected in that it occurs during the portion of the duty cycle when the drop-yarns are not in tension and are not performing any useful function. The drop-yarns have no purpose when not in tension and do not support compression loads, so as not to interfere with the primary function of the pressurizing medium which is to support compression loads.

Figure 28A:
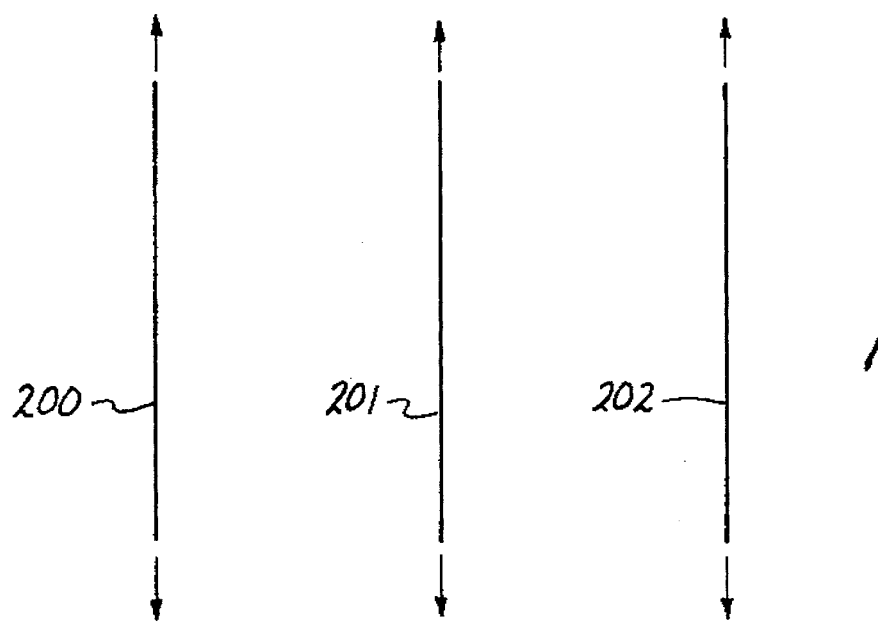
FIG. 28a is a highly enlarged schematic representation of three different types of fibers in tension 1) flat untexturized fiber, 2) conventionally texturized fiber, and 3) special air-bulked, heat set fiber.
Figure 28B:
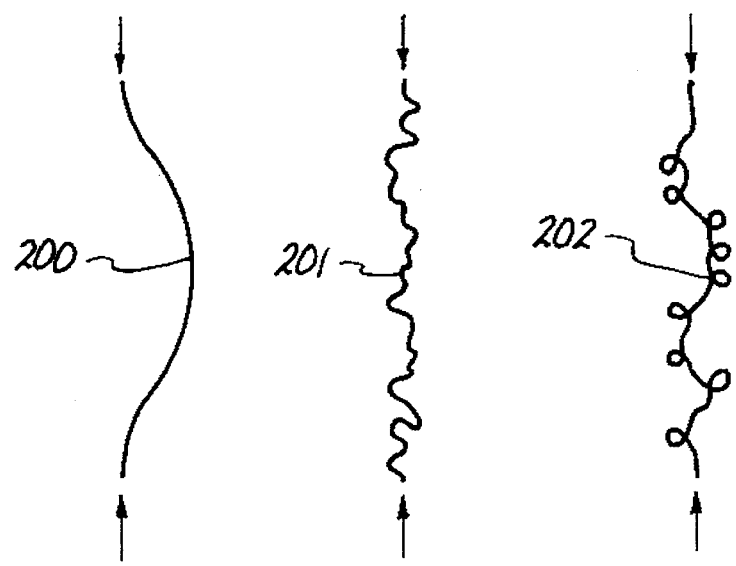
FIG. 28b is a schematic representation of the same three fibers of FIG. 28a in a partially compressed, or relaxed, condition.
Figure 28C:
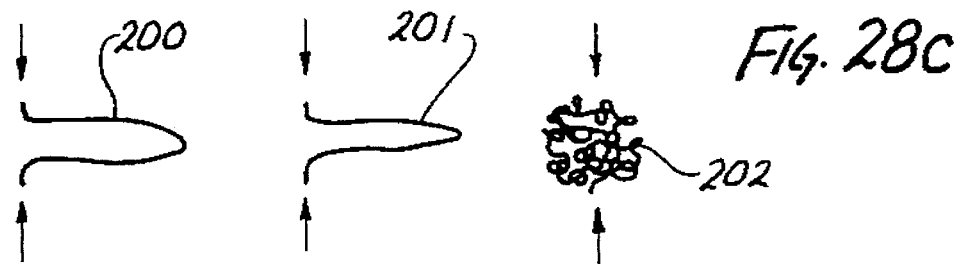
FIG. 28c is a schematic representation at 1,000 times actual size of the same three fibers of FIG. 28b after several million cycles of flexing in the near-bottomed-out condition.
Figure 29C:
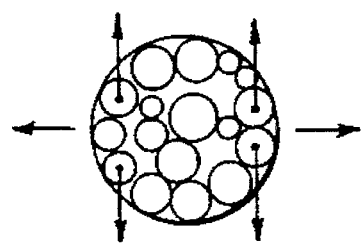
FIG. 29c is an enlarged cross-section of a single flat fiber of the fiber bundle of FIG. 29b showing how the transverse loading condition can cause bundles (or groups) of molecular chains within the single fiber to start to separate and subsequently break apart, causing a fibrillation type failure of a single fiber (see also FIG. 30), after repeated application of loading and unloading of a transverse load.
Figure 30:
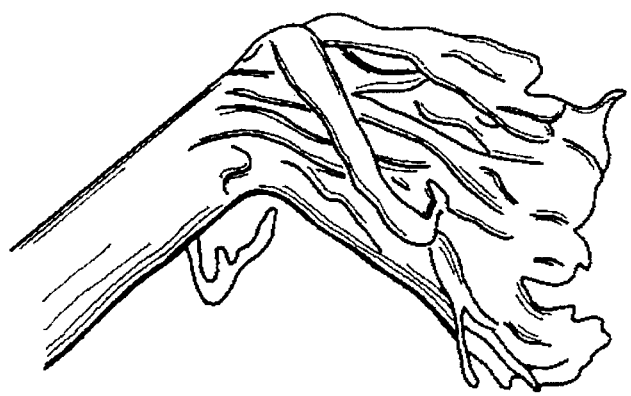
FIG. 30 is a view of a scanning electron microscope photograph at 1000 times actual size obtained of a single pile interlock fiber after one of these tensile element fibers of the present invention had experienced a fibrillation-type failure resulting from approximately one million cycles of compression and associated abrasion, and bending and flexural fatigue.

A good design deflects as much as possible within space constraints, so as to allow the pressurizing medium to fully support and attenuate shock loads and absorb and return as much otherwise wasted energy as possible. As soon as the drop yarns go out of tension (FIG. 28b) they start to bend, coil and fold. As the downward motion continues, they bend and fold further in random fashion and thus also rub against one another. During this portion of the duty cycle, there is considerable motion among and between the yarn strands. This motion is aggravated by shearing loads (associated with stopping and turning) applied to the air-cushion as well as by the longitudinal and lateral twisting and flexing of the cushion as the athlete goes through the sometimes very severe motions while performing various athletic endeavors. Such bending and flexing of the drop yarns generates fatigue stresses in the outer portions of individual fibers. Abrasion damage can occur as the fibers squirm and move against one another. Under extremely heavy load conditions (i.e., generally less than 2% of the normal time/life duty history of the part) the product bottoms-out trapping and crushing the tensile fibers against one another and against the inner surfaces of the composite facing layers (FIG. 28c). After many cycles of such contorting, it is possible for tensile yarn filament fatigue and fibrillation failures to occur as a result of the repeated crushing of the tensile elements when bottoming-out occurs, (FIGS. 29c and 30). Some of the fibers are weakened and then subsequently fail in tension. Tension stress in remaining fibers increases, and a ripple effect occurs as successive fibers fail in tension. Eventually an aneurysm occurs. The air-bulk, heat set texturizing of the fibers is effective in controlling and preventing this type of failure and is explained next.

Because most cushioning devices of this type are designed to operate close to their limits for bottoming-out, in order to provide maximum cushioning in minimum space, instances of bottoming-out do occur, which aggravates this failure problem.

In order to solve this problem, considerable failure analysis and laboratory testing were conducted. The mechanism of failure and the solutions which were devised to solve the problems are best described in referring in more detail to the series illustrated in FIGS. 28 and 29. The series of FIG. 28 illustrates the manner in which three types of fibers, i.e., 1) straight or flat fibers 200, 2) conventionally texturized fibers 201 and 3) air-bulked, heat-set fibers 202 function differently during the downward flexing mode, especially as regards the bottomed-out condition. As is indicated in FIG. 28a, when in the tension mode, all three types of fibers are stretched-out in a taunt, straight line, and all three function in much the same way under tensile loads. However, as soon as an external compression load is applied, the air-cushion deflects downwardly and the fibers of the drop yarns immediately go out of tension and enter the relaxed mode (FIG. 28b). The straight (untexturized) fiber 200 functions much like an Euler column and starts to bend. The conventionally texturized fiber 201 (which, as seen, is bulkier than the straight fiber) shortens in length like a coil spring. The air-bulked, heat-set fiber 202 (bulkier than the conventionally texturized fiber) also shrinks in length in a similar manner as a spring. The bottomed-out condition, after several million cycles of up and down flexing is shown in FIG. 28c. As is seen, the straight fiber 200 has bent over onto itself. The air-bulked fiber 202 is compressed into a bulky, compliant bundle of looped and intermixed fibers coiled amongst themselves in various directions in random fashion. The conventionally texturized fiber 201 because of many cycles of tension and flexing is seen as having resorted back to its original pre-texturized condition, i.e., it is now a straight fiber, and, as such, has bent back upon itself in the same way as the other straight fiber in this illustration. After many cycles of exposure to such action the fiber will tend to fail, as next explained.

Figure 29A:
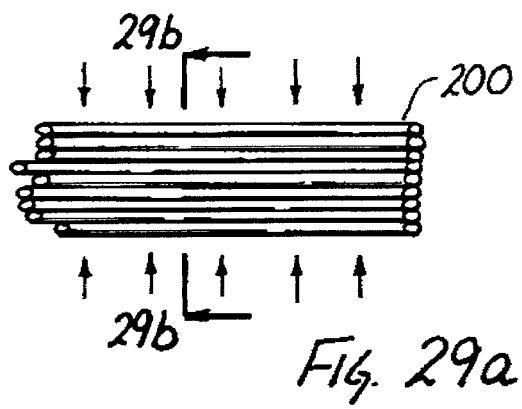
FIG. 29a is a plan view schematic representation of a bundle of flat, untexturized fibers, as in a portion of yarn bundle, being subjected to a transverse loading condition.
Figure 29B:
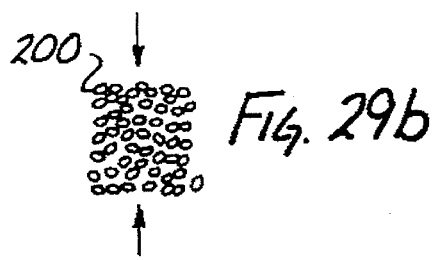
Figure 29D:
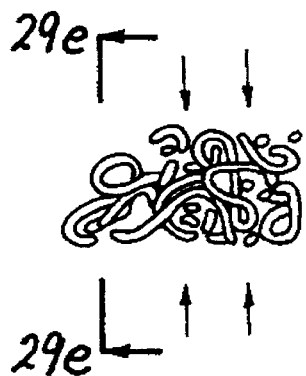
FIG. 29d is similar to FIG. 29a for the example of an air-bulked, heat-set fiber bundle.
Figure 29E:
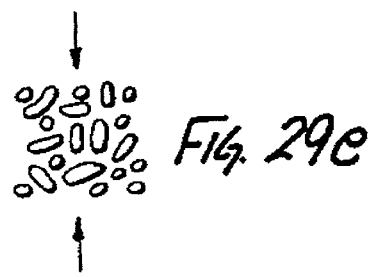
FIG. 29e is similar to FIG. 29a for the example of an air-bulked, heat-set fiber bundle.

A portion of a yarn containing the straight fibers is shown in the bottomed-out configuration (at 40 times actual size) in FIG. 29a. As is seen, the fibers are tightly packed together in essentially a parallel, aligned, side-by-side arrangement. The compression load is shown applied to the sides of the yarn bundle as seen in FIG. 29a and the cross-section FIG. 29b. The fibers are applying transverse loading one to another. Each fiber is made from a polymer with a long-chain molecule oriented generally along the longitudinal axis of the fiber. After prolonged bending and flexing during the up and down portions of the cycle, coupled with the squirming, rubbing and transverse loading of the bottomed-out portion of the cycle, transverse decohesion (delamination) between individual bundles of molecular chains within the interior of a single straight fiber can occur. This failure mode is illustrated in FIG. 29c which is a magnified cross section view (1000 times actual size) of a single fiber from the bundle of fibers in FIG. 29B). As is seen, when the transverse compression load is applied to the straight fiber, the fiber tends to burst outwardly on the horizontal center-line plane, and tensile separation stresses occur at the sides of the fiber tending to delaminate and unravel the various bundles of molecular chains one from another. The fiber breaks apart into individual bundles or strands of molecular chains. Eventually, these small strands are weakened by fatigue and soon snap and fail either in tension or bending. This condition is seen in FIG. 30 which is a scanning electron microscope photograph of a typical failure of this type (enlarged approximately 1,000 times). The separation of a single fiber into various strands (of molecular bundles) is seen.

On the other hand, the heat-set, air-bulked fibers (FIG. 29d and 29e) behave differently from the straight fiber. The air-bulked fibers in the bottomed-out condition have been compressed into an intertwined mass of looped and undulating filaments. Such a conglomeration of fibrous material functions as a cushioning element (much like a felt mat), thereby mitigating compression stresses on any single filament and distributing forces throughout the fibrous volume.

As a result of testing and analysis of the type just described, it was determined that several factors are important to take into consideration in order to control or eliminate this type of failure. First, it is important to have a fiber with the longest possible molecular chain oriented as much a possible along the longitudinal axis of the filament. Secondly, it is important to use a polymer with superior abrasion resistance, such as DuPont's industrial polyester 68L. Better yet, are fibers made from the NYLON 66 family, especially CORDURA nylon, (having especially long chains).

Thirdly, texturizing of the drop-thread filaments is a necessity to improve abrasion flexural fatigue, and fibrillation resistance by helping to cushion the loading on any individual fiber and preventing the filaments from being subjected to sharp folds, as yarns move against one another. In this regard Cordura, is greatly superior because of its air-bulked type of heat-set texturizing which not only provides a yarn with increased bulk but also with fibers which retains their texturized spring-like condition after prolonged cycles of going from the tension mode to the relaxed, folded mode and back again to the tension mode because of being heat-set in the texturized condition. Other types of texturized filaments, lose their texturized shape after exposure to repeated cycles of loading and unloading (as we as due to heating during fabrication) of the product and return to their original untexturized, flat yarn configuration. It is for this reason that air cushions of this new type made from Cordura nylon exhibit a service life which is about one order of magnitude better than the standard texturized nylon 66 yarn. Further, the standard texturized yarn is approximately one full order of magnitude superior in service life than the flat untexturized tensile yarn.

There is also a fourth important consideration to minimize these failures. It has been found necessary to provide a sufficient number of fibers per unit area of the drop threads to further cushion the abrasion and transverse loading forces, especially those associated with side-load shear crushing and bending of the planar surfaces of the air-cushion. In this regard, the approximate minimum number of drop yarn fibers per square inch is 5,000 and the maximum is approximately 80,000.

Several other embodiments of the invention are shown in FIG. 31 and related FIGS. 31a–31d in order to highlight the different cushioning properties possible with different types of designs all at the same inflation pressure. The FIG. 31a ped 220 exhibits a steep rise 220a in support force as deflection increases because of the small volume of gas contained within the ped (i.e., most of the load supporting volume of the device is trapped beneath the loaded area). The various compartments 221, 222 and 223 of the FIG. 31b full-length design behave in the same way (220a), and provide a stiffer feel as compared to the full-length cushioned product 225 of FIG. 31d (see 225a). The form 227 of FIG. 31c, in a dog-bone configuration, provides support primarily under the load-bearing portions of the foot (for cost saving purposes), and has an intermediate force-deflection curve 227a.

Figure 32:
FIGS. 32 and 32c are plan views and FIGS. 32a, 32b, 32d, and 32e are cross-section views of two inflated cushions of the present invention having different elastic, deformable pressure accumulation volumes around their perimeter for customizing the cushioning properties of the devices.
Figure 32A:
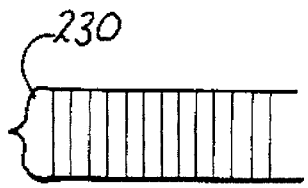
Figure 32B:
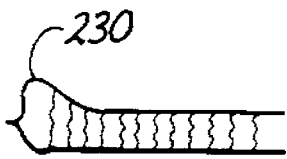
Figure 32C:
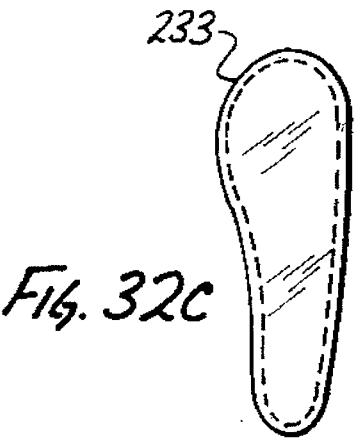
Figure 32D:
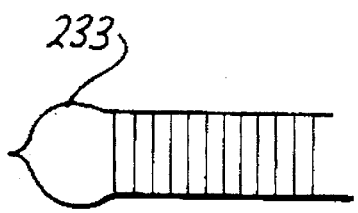
Figure 32E:
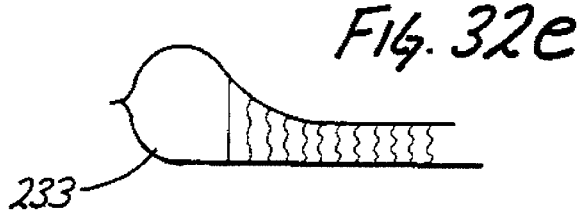

Referring to FIGS. 32 and 32a–32e, another way to influence and control the cushioning characteristics is to provide an accumulator volume into which the inflation gas can be mass transported from one portion of the device to another upon application of load. One such accumulator transport volume can be around the perimeter 230 as is shown in FIGS. 32,32a and 32b. The larger volume 233 of FIGS. 32c–32e, of course, provides the softer feel. The softness of feel is achieved in two ways: 1) the extra volume outside the loaded area (FIG. 32e) provides a space for the inflatant gas to move into upon application of load and 3) the elastomeric film enclosing the accumulator can elastically expand and contract in response to changes in the gas pressure when the load is applied, thereby further increasing the volume of the accumulator and the soft responsive cushioning properties of the device. This larger tubular section serves a secondary dynamic, load proportional function of cupping and holding the foot centrally positioned within the shoe.

Figure 33D:
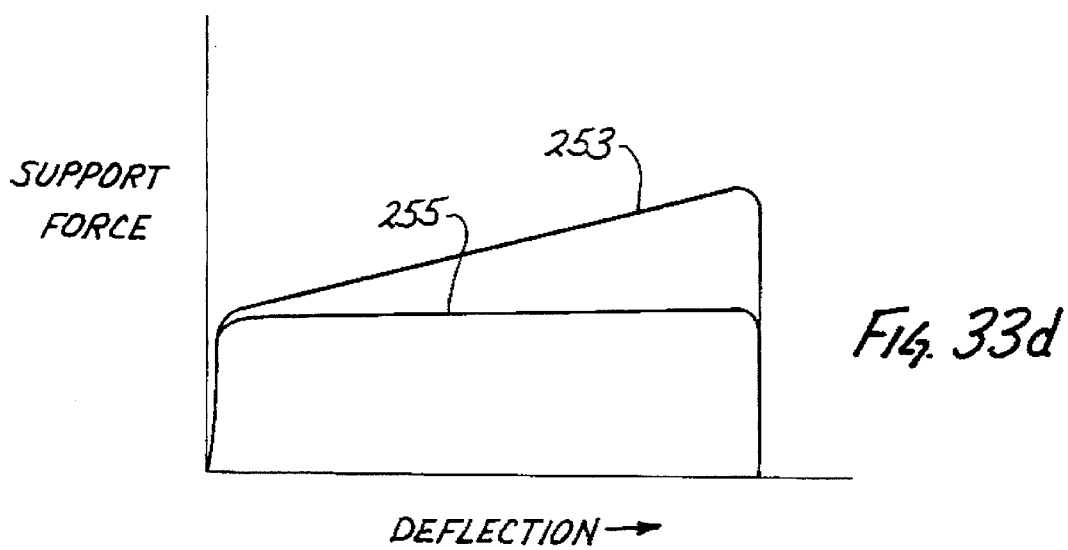

FIG. 33 illustrates an alternate and beneficial unique means for providing an accumulator volume. This is accomplished by having a hybrid product 250 in accordance with this invention, including a standard air-cushion system incorporating a tubular portion 251 in the arch area, as shown in FIGS. 33b and 33c and a portion 252 in accordance with this invention. FIG. 33b shows a section view through the arch area with zero load. FIG. 33c is the same section view in the loaded condition. FIG. 33d is the load-deflection graph illustrating the conventional product 253 in accordance with this invention (without the standard air cushion) while plot 255 is that for the hybrid product in accordance with this invention. As is indicated, the tubes can elastically grow and shrink in size (diameter) when the load is applied and removed in direct proportion to the applied load and the resultant instantaneous pressure changes within the device. A softer feel is provided to portions of the air-cushion where the load is applied (heel area or forefoot). Also an automatic dynamic arch support proportional to the wearer's need occurs under the longitudinal arch portion of the foot to assist as an orthotic device for pronation control. At toe-off the arch support automatically recedes away from supportive contact with the foot so as not to irritate the plantar tendons as they extend during the toe-off phase.

Another interesting configuration involves a multi-layer pressurized product. This is shown in FIGS. 34a, 34b and 18 where the reference numerals are the same. The two (or more) pressurized layers can be achieved with two separate tensile air-cushion devices, one on top of the other, with separate perimeter seals, all as already described. Another method is to laminate the stack in a single operation, and to seal the three sheets of barrier film around the perimeter in a single operation. For maximum comfort, the top portion can be inflated to a lower pressure than the bottom chamber. The top, at lower pressure, thus deflects more easily than the bottom portion, and conforms more readily to the bottom planar surface of the foot; thus a high degree of initial contact softness is perceived. The higher pressure bottom chamber prevents the device from bottoming-out under high loads and returns a greater percentage of the otherwise damaging and wasted impact energy.

Figure 26A:
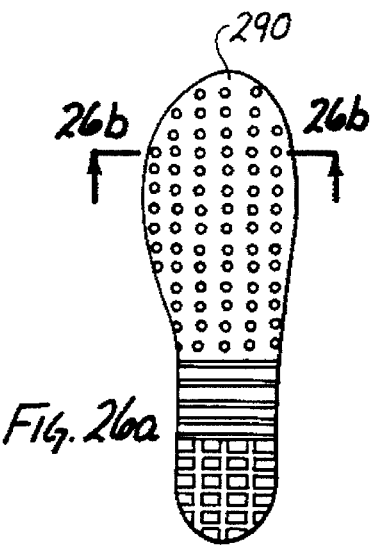
Figure 35A:
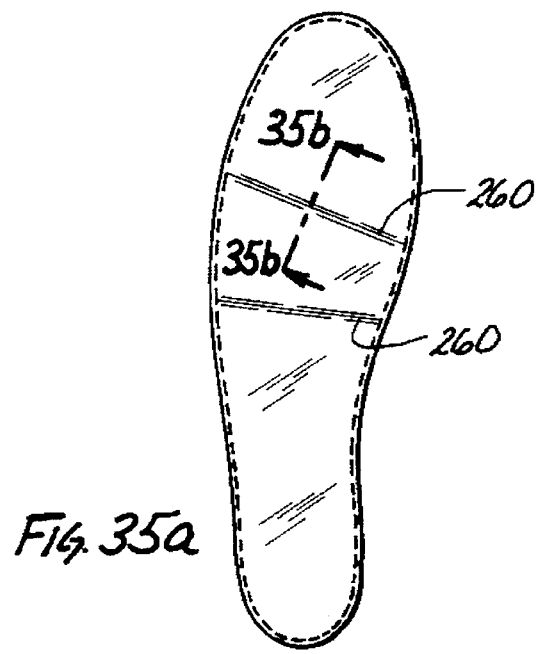
FIG. 35a and FIG. 35b are a plan view and a cross-section view of the cushioning device of the present invention having sewn-in lateral flex lines to improve the bending flexibility of the device during walking, running and other athletic endeavors.
Figure 35B:
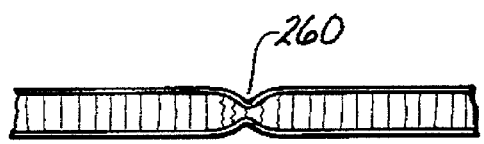

In some shoe applications, a high degree of toe flex is desired, as in a walking shoe. This can be achieved by incorporating two or more separate ped elements into the shoe, one for the heel and one for the forefoot, and possibly one for the arch/mid-foot region. Another method involves sewn flexlines 260 extending laterally across the die-cut fabric blanks prior to the final step of laminating the barrier film into place as shown in FIGS. 35a and 35b. Such sewn lines draw the fabric down a prescribed distance (½ to ¾ of the thickness of the fabric) using care not to seal the fabric completely closed, thereby precluding movement of air across the sewn line, or a line of discomfort under the foot. Another method is by having lugs, or bars positioned on the bottom of a moderator element in the region(s) where flexure is desired, as shown in FIG. 26a.

Figure 36A:
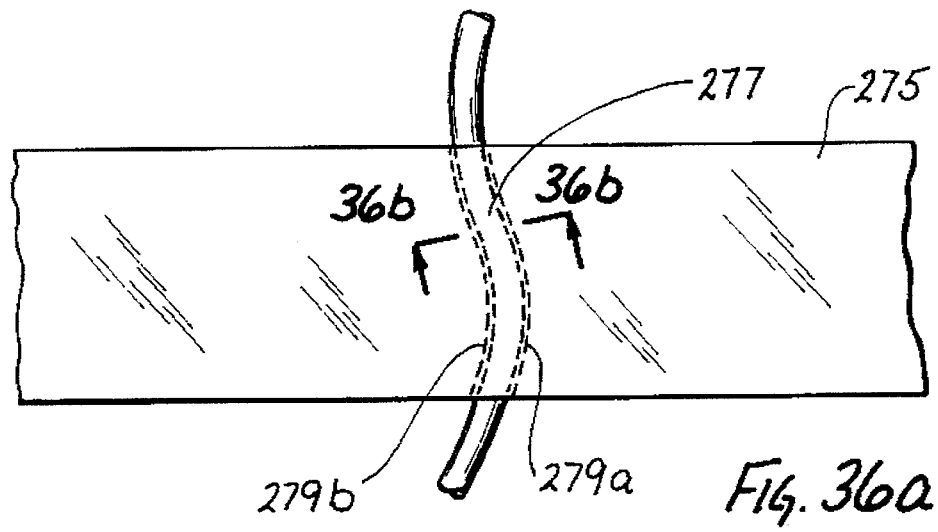
FIG. 36a is a 20 times actual size plan view schematic representation of a filament having been imbedded in a perimeter seal when the perimeter seal was made in the barrier film.
Figure 36B:
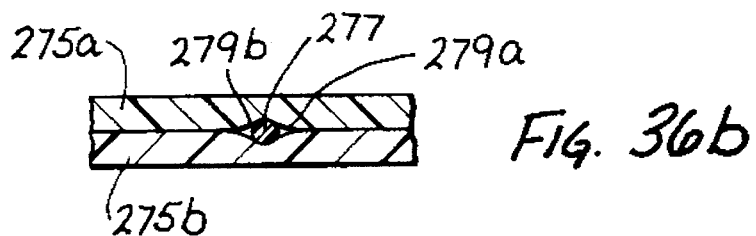
FIG. 36b is a view in cross-section of FIG. 36a showing the potential leakage path around the fiber through which the inflatant gas can slowly leak out of the device of this invention when improper manufacturing or quality control procedures are used.
Figure 36C:
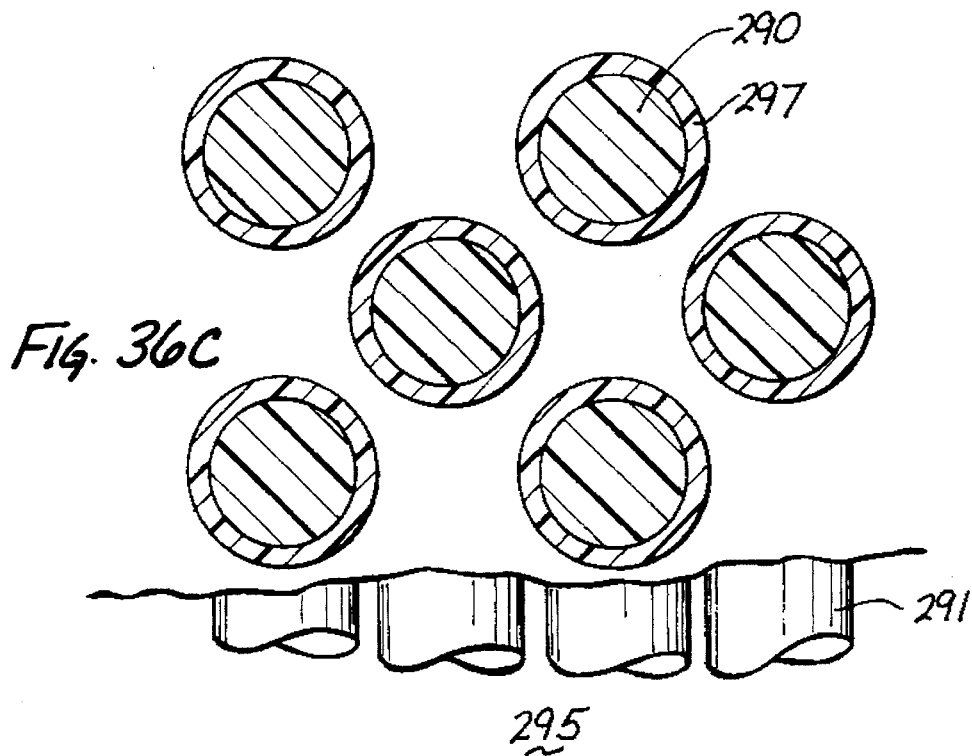
FIG. 36c is a schematic representation at 500 to 1000 times size of a cross-section of a group of fibers in the outer layer of fabric of the device of this invention which have been impregnated and surrounded with molten coupling agent material which shrinks when it cools and develops a tight shrink fit around each fiber thereby eliminating potential inflatant leakage paths.

To better understand the leakage problem which was discovered to be a significant problem and which is solved by this invention, reference is made to FIGS. 36a, 36b and 36c. In FIGS. 36a and 36b, a weld section 275 composed of layers 275a and 275b is shown in which the pressure side is 276. A single filament 277 is show extending through the weld 275 from the pressure side 276 to the outside ambient pressure side 278. The residual stress in the film or layers 275a and 275b tends to pull away from the filament 277 resulting in minute leakage paths 279a and 279b typically along the lateral sides where the layers join to the filament. As shown the filament 277 extends all the way through the weld and represents the worst condition. Leakage may occur even if the filament does not extend all the way through the weld since the distance between the end of the filament and the outside of the weld may be sufficiently small to permit more rapid diffusion in that area than is taking place in other regions of the film.

FIG. 36c illustrates another feature of the invention which is the effect of the coupling agent in reducing leakage along the fibers 290. For example, fiber 291 is one of the drop threads and is located on the gas pressure side 295 of the inflated product of this invention. During application of the coupling agent, the latter is melted and flows around the fiber, as indicated at 297, effectively sheathing all or a portion of the outer surface of the fiber with coupling material. This effectively prevents or substantially reduces passage of the gas along the fiber or the outer surface thereof and between that surface and the barrier film material.

What has been described are preferred embodiments and modifications in Which changes may be made without department from the spirit and scope of the accompanying claims.

What is claimed is:

1. An internally pressurizable envelope having spaced inner and outer surfaces comprising:

first and second fabric layers positioned in said envelope such that one surface of each fabric layer is facing an inner surface of said envelope, said envelope being of elastomeric material, each of said fabric surfaces being bonded to the facing inner surface of said envelope, said fabric layers including a yarn material which is texturized or flannelized or bulked to increase the bonding to the facing layer of said envelope, flexible means between said fabric layers for restraining the movement of said fabric layers away from one another beyond a predetermined distance, and a gas in the interior of said envelope to pressurize the same.

2. An internally pressurizable envelope having spaced inner and outer surfaces for use in footwear wherein said envelope is exposed to relatively high localized and cyclic loads comprising:

a fabric material having first and second fabric layers positioned in said envelope such that each surface thereof is facing an inner surface of said envelope, said envelope being of elastomeric material and including at least a portion which forms a sealed seam, each of said fabric surfaces being bonded to the facing inner surface of said envelope, flexible means between said fabric layers for restraining the movement of said fabric layers away from one another beyond a predetermined distance, said flexible means including a plurality of fibrous strands extending between said fabric layers and being joined thereto, said sealed seam being essentially free of fibrous material of said fabric layers and said fibrous strands, and a gas in the interior of said envelope to pressurize the same whereby said fibrous strands are placed in tension to maintain the opposed surfaces of said envelope in planar configuration and said gas operating as the medium which absorbs compressive loads on said envelope.

3. An internally pressurized envelope comprising:

a hermetically sealed envelope defining at least one pressurized chamber, said envelope being composed of elastomeric material which in conjunction with other portions of the structure, is substantially impervious to large molecule size gases and slightly permeable to oxygen;

a compressible fabric structure within said chamber, the fabric of said compressible fabric structure including a yarn material which is texturized or flannelized or bulked, said compressible fabric structure being substantially coextensive with said chamber and comprising a first fabric layer, a second fabric layer normally spaced from said first layer, flexible means which are also compressible positioned between said layers and forming a part of said fabric for restraining said fabric layers from separating more than a predetermined distance;

means for forming a substantially continuous bond between said outer covering and said first and second fabric layers;

said fabric layers being at least partially imbedded within said outer covering to reduce diffusion through such covering, said envelope including at least one seamed portion, said seamed portion being free of fibrous material of said compressible fabric structure, and a large molecule sized non-polar gas in said chamber, said envelope being pressurized to pressure of a least two pounds per square inch whereby substantially all of the resistance of said envelope to compression is provided by the gas pressure within said chamber.

4. An internally pressurizable envelope as set forth in any one of claims 1, 2 or 3 wherein said flexible means for restraining holds said fabric layers in predetermined and predefined spaced relationship to one another.

5. An internally pressurizable envelope as set forth in any one of claims 1, 2 or 3 wherein said envelope is substantially free of incompressible areas.

6. An internally pressurizable envelope as set forth in any one of claims 1, 2 or 3 wherein said first and second fabric layers include yarns in which up to about 30% of the fiber elements are discontinuous to increase the bonding to the facing inner surface of said envelope.

7. An internally pressurizable envelope as set forth in any one of claims 1, 2 or 3 wherein the peel strength between said inner surface and the mating surface of said fabric being greater than about 18 pounds per lineal inch.

8. An internally pressurizable envelope as set forth in any one of claims 1, 2, or 3 wherein the fabric layers include filaments composed of a molecular structure which is predominantly crystalline in nature and which functions as a barrier to diffusion of gas therethrough.

9. An internally pressurized envelope as set forth in any one of claims 1 or 3 wherein said texturized, or flannelized or bulked yarn material is heat set.

10. An internally pressurized envelope as set forth in any one of claims 1, 2, or 3 wherein said fabric layers is composed of yarn material which has been processed to prevent formation of any direct and unobstructed passages through to the core of the fabric layers.

11. An internally pressurizable envelope as set forth in any one of claims 1, 2 or 3 wherein said flexible means for restraining the movement of said fabric layers is of sufficient strength to hold said fabric layers at said predetermined distance when the gas pressure in said chamber exceeds approximately 150 pounds per square inch.

12. An internally pressurizable envelope as set forth in any one of claims 1, 2 or 3 wherein said flexible means for restraining the movement of said fabric layers comprises filaments extending between and locked to said fabric layers.

13. An internally pressurizable envelope as set forth in any one of claims 1, 2, or 3 wherein the flexible means is a filamentary material and the fabric layers are of a material different from the material of the filamentary material.

14. An internally pressurizable envelope as set forth in claim 12 wherein said filament are composed of a material having good gas barrier properties.

15. An internally pressurizable envelope as set forth in claim 12 wherein said filaments are composed of an oriented long chain high molecular weight polymer.

16. An internally pressurizable envelope as set forth in claim 15 wherein said polymer is selected form the group consisting of Dacron 56, nylon 66 and Cordura nylon.

17. An internally pressurizable envelope as set forth in claim 15 wherein said filaments have a semi-dull or dull finish.

18. An internally pressurizable envelope as set forth in claim 15 wherein said filaments are composed of texturized or flannelized or bulked and heat set yarn, and wherein said yarn has a uniform high degree of loft.

19. An internally pressurizable envelope as set forth in any one of claims 1, 2 or 3 wherein said fabric layers are impregnated with a coupling agent to a depth which is less than about their thickness, said coupling agent being bonded to said facing surface of said envelope.

20. An internally pressurized envelope as set forth in claim 19 wherein said coupling agent is an elastomeric material and semi-permeable to oxygen.

21. An internally pressurizable envelope as set forth in any one of claims 1, 2 or 3 wherein said gas includes a supergas.

22. An internally pressurizable envelope as set forth in any one of claims 1, 2 or 3 wherein said elastomeric material includes a polyurethane elastomer.

23. An internally pressurized envelope as set forth in any one of claims 1, 2 or 3 wherein the envelope includes an outer surface, said outer surface including a cloth material bonded thereto.

24. An internally pressurizable envelope as set forth in any one of claims 1, 2 or 3 wherein said gas is a nitrogen containing gas.

25. An internally pressurizable envelope as set forth in any one of claims 1, 2 or 3 wherein said envelope is full length insole for use in footwear.

26. An internally pressurizable envelope as set forth in any one of claims 1, 2 or 3 wherein said envelope is a heel ped.

27. An internally pressurizable envelope as set forth in any one of claims 1, 2 or 3 wherein said envelope is a cobra pad type heel ped, and said heel ped having leg segments.

28. An internally pressurizable envelope as set forth in claim 27 wherein one leg segment is longer than the other leg segment.

29. An internally pressurizable envelope as set forth in claim 28 where said leg segments are spaced and separate from each other.

30. An internally pressurizable envelope as set forth in claim 29 wherein a gas inflated chamber is located between said legs.

31. An internally pressurizable envelope as set forth in any one of claims 1, 2 or 3 wherein said envelope includes at least two chambers.

32. An internally pressurizable envelope as set forth in claim 31 wherein said chambers are interconnected.

33. An internally pressurizable envelope as set forth in claim 31 wherein said chambers are located one above the other.

34. An internally pressurizable envelope as set forth in claim 31 wherein one of said chambers is pressurized to a pressure different from the other chamber.

35. An internally pressurizable envelope as set forth in any one of claims 1, 2 or 3 wherein the surfaces thereof are in planar relation.

36. An internally pressurizable envelope as set forth in any one of claims 1, 2 or 3 wherein said fabric material is a double needle bar Raschel knit material.

37. An internally pressurized envelope as set forth in any one of claims 1, 2 or 3 wherein said flexible means are drop threads comprised of about 50 to 1,000 strands per square inch of fabric and wherein the bulk density of the drop threads is in the range of 5,000 to 150,000 fibers or filaments per square inch.

38. An internally pressurized envelope as set forth in any one of claims 1, 2 or 3 wherein said envelope is in the configuration of an insole having a substantially uniform thickness, and said envelope being free of incompressible areas throughout the load bearing portions of the said insole.

39. An internally pressurizable envelope as set forth in claim 38 wherein said insole is contoured to the shape of the plantar load bearing surface of the foot.

40. An internally pressurized envelope as set forth in any one of claims 1, 2 or 3 wherein said fabric layers are in spaced predetermined contoured relation to each other.

41. An internally pressurized envelope as set forth in any one of claims 1, 2 or 3 wherein said envelope includes an inflated section free of fabric material.

42. An internally pressurized envelope as set forth in any one of claims 1, 2 or 3 wherein said envelope includes at least one elastically deformable gas pressure energy accumulator section along a periphery thereof.

43. An internally pressurized envelope as set forth in any one of claims 1, 2 or 3 further including a flexible foam material at least in contact with at least a portion of said envelope.

44. An internally pressurized envelope as set forth in any one of claims 1, 2 or 3 wherein said fabric includes sewn flex lines.

45. An internally pressurized envelope as set forth in any one of claims 1, 2 or 3 further including a studded moderator in which the studs or ribs contact at least a portion of the envelope.

46. An internally pressurized envelope as set forth in any one of claims 1, 2 or 3 wherein said flexible means are drop threads arranged perpendicular to the fabric layers.

47. An internally pressurized envelope as set forth in any one of claims 1, 2 or 3 wherein said flexible means are drop threads arranged at an angular orientation with respect to said fabric layers.

48. An internally pressurized envelope as set forth in any one of claims 1, 2 or 3 wherein said envelope is formed of film material.

49. An internally pressurized envelope as set forth in any one of claims 1, 2 or 3 wherein said envelope is a pre-formed envelope.

\* \* \* \* \*